United States Patent
Bai et al.

(10) Patent No.: US 12,418,922 B2
(45) Date of Patent: Sep. 16, 2025

(54) TRANSMISSION CONFIGURATION INDICATION (TCI) IN DOWNLINK CONTROL INFORMATION (DCI) RULES AND ASSOCIATED TECHNIQUES

(71) Applicant: QUALCOMM Incorporated, San Diego, CA (US)

(72) Inventors: Tianyang Bai, Somerville, NJ (US); Yan Zhou, San Diego, CA (US); Mostafa Khoshnevisan, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 17/810,460

(22) Filed: Jul. 1, 2022

(65) Prior Publication Data

US 2024/0008044 A1    Jan. 4, 2024

(51) Int. Cl.
*H04W 72/23* (2023.01)
*H04L 1/1829* (2023.01)
*H04L 5/00* (2006.01)

(52) U.S. Cl.
CPC .......... *H04W 72/23* (2023.01); *H04L 1/1864* (2013.01); *H04L 5/0007* (2013.01); *H04L 5/0055* (2013.01)

(58) Field of Classification Search
CPC .... H04W 72/23; H04L 1/1864; H04L 5/0007; H04L 5/0055
See application file for complete search history.

(56) References Cited

U.S. PATENT DOCUMENTS

| | | | |
|---|---|---|---|
| 11,974,281 B2* | 4/2024 | Farag | H04B 7/088 |
| 2019/0281587 A1* | 9/2019 | Zhang | H04W 72/23 |
| 2021/0105778 A1* | 4/2021 | Zhou | H04W 80/02 |

(Continued)

FOREIGN PATENT DOCUMENTS

| | | | | |
|---|---|---|---|---|
| WO | WO-2020231834 A1 * | 11/2020 | | H04L 5/0044 |
| WO | WO-2022212308 A1 * | 10/2022 | | H04B 7/022 |

(Continued)

OTHER PUBLICATIONS

International Search Report and Written Opinion—PCT/US2023/024596—ISA/EPO—Oct. 5, 2023.

(Continued)

*Primary Examiner* — Michael J Moore, Jr.
(74) *Attorney, Agent, or Firm* — QUALCOMM IP DEPT.; James Hunt Yancey, Jr.

(57) ABSTRACT

Wireless communications systems and methods can prioritize updated indication (TCI) states. A method of wireless communication, performed by a user equipment includes receiving first downlink control information (DCI). The first DCI indicates a first (TCI update. The method also includes receiving second DCI. The second DCI indicates a second TCI update different than the first TCI update. The method also includes transmitting, based on the first DCI, a first acknowledgement (ACK) associated with the first DCI. The method further includes transmitting, based on the second DCI, a second ACK associated with the second DCI. The method further includes switching, based on a prioritizing of the first TCI update or the second TCI update, from a first TCI state to a second TCI state.

30 Claims, 21 Drawing Sheets

(56) References Cited

U.S. PATENT DOCUMENTS

| | | | |
|---|---|---|---|
| 2021/0337536 A1* | 10/2021 | Li | H04L 5/0055 |
| 2022/0132549 A1* | 4/2022 | Yu | H04L 1/1812 |
| 2022/0150945 A1* | 5/2022 | Zhang | H04L 5/0053 |
| 2022/0232544 A1* | 7/2022 | Bai | H04W 72/23 |
| 2022/0287013 A1* | 9/2022 | Farag | H04L 5/0035 |
| 2023/0087280 A1* | 3/2023 | Zhang | H04L 1/0061 370/329 |
| 2023/0254870 A1* | 8/2023 | Khoshnevisan | H04L 5/0091 370/329 |
| 2023/0397217 A1* | 12/2023 | Chung | H04L 1/1864 |
| 2024/0008044 A1* | 1/2024 | Bai | H04B 7/0695 |
| 2024/0048295 A1* | 2/2024 | Choi | H04L 1/1864 |
| 2024/0080856 A1* | 3/2024 | Wang | H04L 1/1854 |
| 2024/0089943 A1* | 3/2024 | Yu | H04L 5/0055 |
| 2024/0107536 A1* | 3/2024 | Bai | H04L 5/0055 |
| 2024/0129988 A1* | 4/2024 | Yuan | H04L 5/0048 |
| 2024/0147494 A1* | 5/2024 | Bai | H04W 72/232 |
| 2024/0172245 A1* | 5/2024 | Svedman | H04W 72/1268 |
| 2024/0306015 A1* | 9/2024 | Matsumura | H04L 5/0053 |
| 2025/0007584 A1* | 1/2025 | Svedman | H04B 7/0626 |

FOREIGN PATENT DOCUMENTS

| | | | | |
|---|---|---|---|---|
| WO | WO-2022216654 A1 | * | 10/2022 | H04B 7/0695 |
| WO | WO-2022217217 A1 | * | 10/2022 | H04B 7/0695 |

OTHER PUBLICATIONS

Nokia., et al., "Maintenance of Enhancements on Multi-Beam Operation", 3GPP TSG RAN WG1 #109-e, R1-2204535, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 25, 2022, 13 Pages, XP052138104, pp. 2-3.

Xiaomi: "Remaining Issues on Multi-beam Operation Enhancement", 3GPP TSG RAN WG1 #109-e, R1-2203771, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 25, 2022, 7 Pages, XP052137866, p. 5-6.

* cited by examiner

| TCI State | RS Resource | QCL Type |
|---|---|---|
| 0 | SSB resource for SSB #n | {A, D} |
| 1 | CSI-RS resource for CSI-RS #k | {A} |
| ... | ... | ... |
| M-1 | SSB resource for SSB #p | {A,D} |

| TCI State | RS Resource | QCL Type |
|---|---|---|
| 0 | DL channel 1, DL RS 1 | {D} |
| 1 | DL channel 2, DL channel 3 | {D} |
| 2 | UL channel 1, UL RS 1 | {D} |
| ... | ... | ... |
| M | DL channel M, UL channel M | {D} |

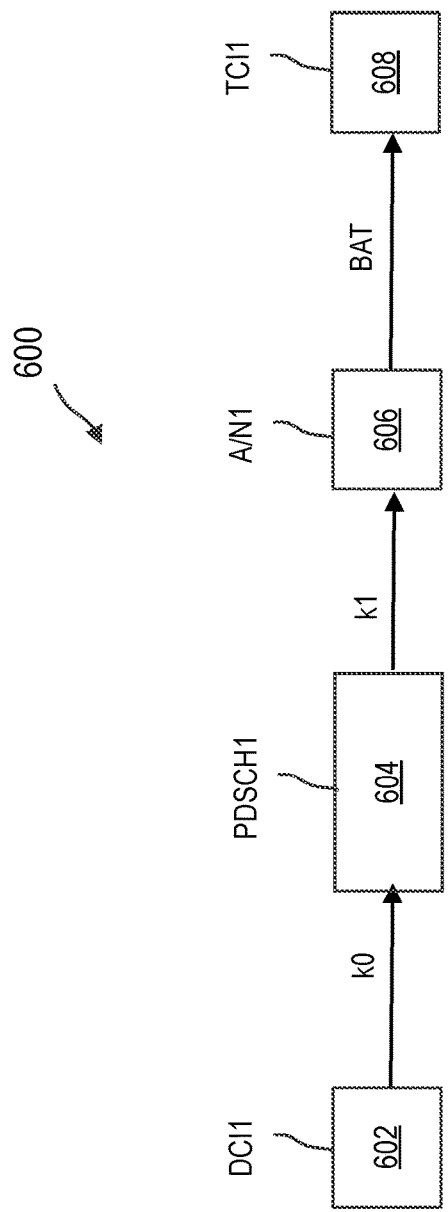
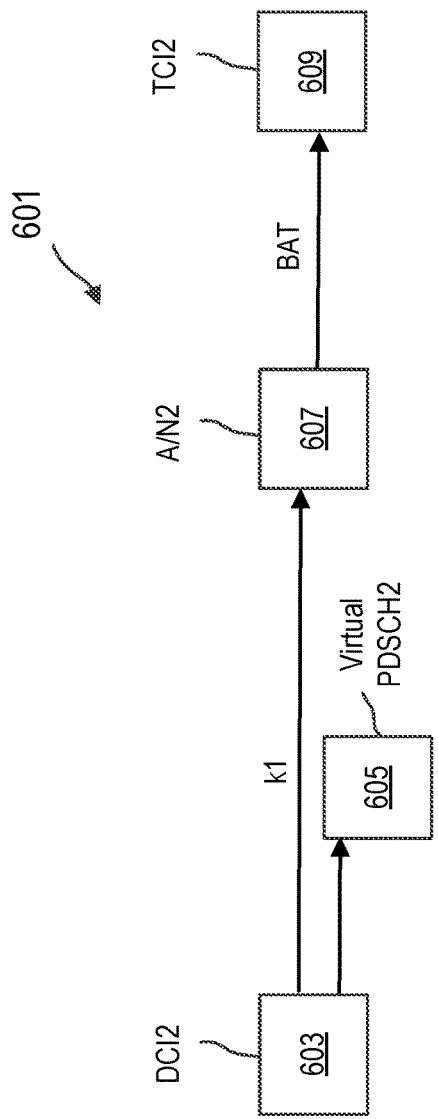
FIG. 6A
FIG. 6B

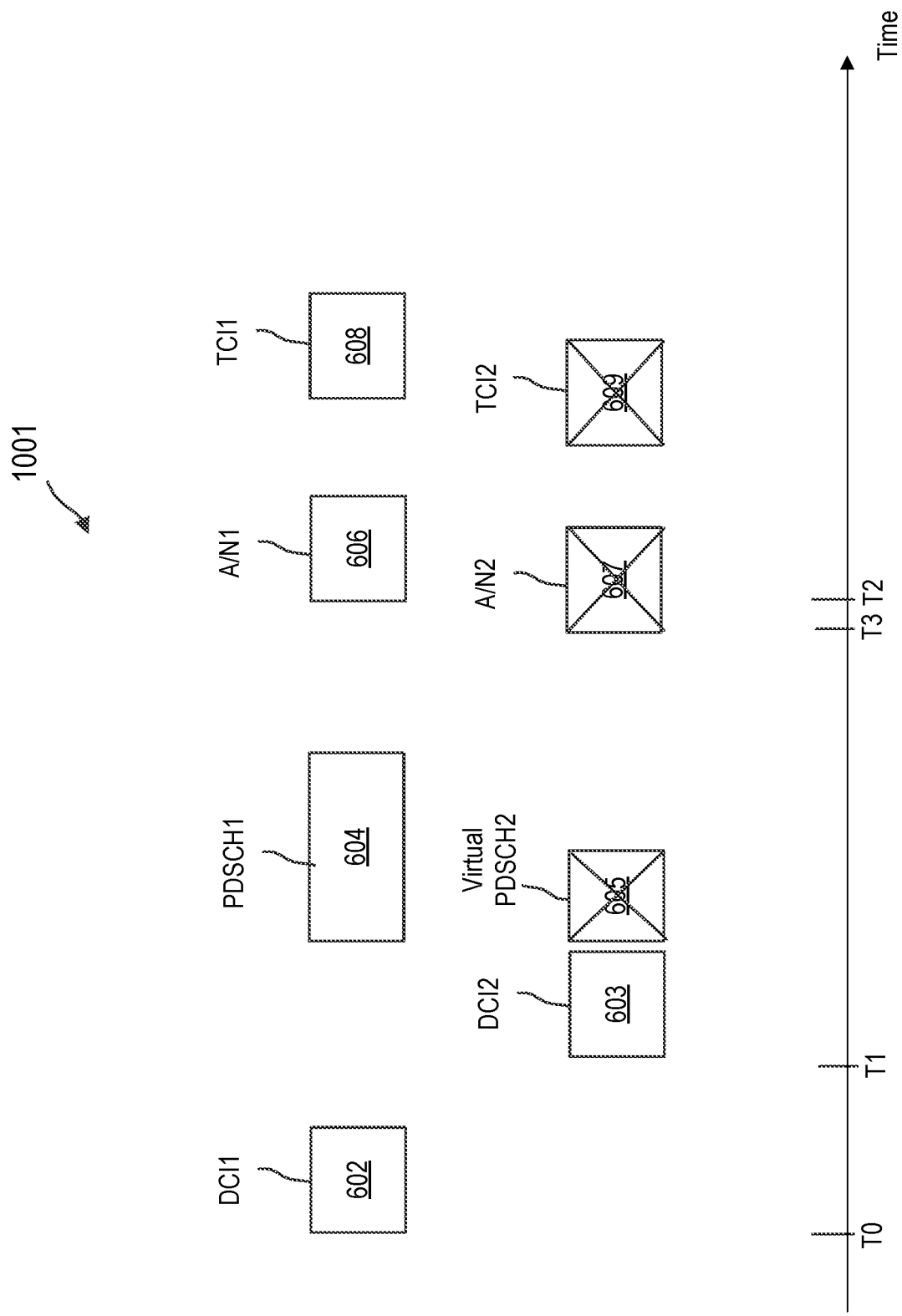

TRANSMISSION CONFIGURATION INDICATION (TCI) IN DOWNLINK CONTROL INFORMATION (DCI) RULES AND ASSOCIATED TECHNIQUES

TECHNICAL FIELD

The present disclosure is directed to wireless communication systems and methods. The present disclosure includes downlink control information (DCI) having a transmission configuration indication (TCI), including rules and associated techniques for wireless communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For instance, NR is designed to provide a lower latency, a higher bandwidth or a higher throughput, and a higher reliability than LTE. NR is designed to operate over a wide array of spectrum bands, for instance, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a network unit may configure a UE with quasi-co-location (QCL) related information for receiving DL communications from the network unit or transmitting UL communications to the network unit. Two antenna ports are quasi-co-located when a signal received from one antenna port experiences a same channel or at least a similar channel as another signal received from the other antenna port. QCL can be at various levels. For instance, QCL can be in terms of doppler shift, doppler spread, average delay, delay spread, and/or receive spatial parameter. In some instances, a transmission configuration indication (TCI) state may be utilized by the network unit and the UE based on one or more QCL parameters. In some aspects, the network unit may provide an indication of the TCI state to the UE via downlink control information (DCI).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to aspects of the present disclosure, a method of wireless communication performed by a user equipment (UE) includes receiving first downlink control information (DCI). The first DCI indicates a first transmission configuration indication (TCI) update. The method also includes receiving second DCI. The second DCI indicates a second TCI update different than the first TCI update. The method further includes transmitting, based on the first DCI, a first acknowledgement (ACK) associated with the first DCI. The method further includes transmitting, based on the second DCI, a second ACK associated with the second DCI. The method further includes switching, based on a prioritizing of the first TCI update or the second TCI update, from a first TCI state to a second TCI state.

Aspects of the present disclosure include a method of wireless communication performed by a network unit. The method includes transmitting first downlink control information (DCI). The first DCI indicates a first transmission configuration indication (TCI) update. The method also includes transmitting second DCI. The second DCI indicates a second TCI update different than the first TCI update. The method further includes receiving a first acknowledgement (ACK) associated with the first DCI. The method further includes receiving a second ACK associated with the second DCI. The method further includes switching, based on a prioritizing of the first TCI update or the second TCI update, from a first TCI state to a second TCI state.

In some aspects, a user equipment (UE) comprises: a memory; a transceiver; and at least one processor coupled to the memory and the transceiver, wherein the UE is configured to: receive first downlink control information (DCI) indicating a first transmission configuration indication (TCI) update; receive second DCI indicating a second TCI update different than the first TCI update; transmit, based on the first DCI, a first acknowledgement (ACK) associated with the first DCI; transmit, based on the second DCI, a second ACK associated with the second DCI; and switch, based on a prioritizing of the first TCI update or the second TCI update, from a first TCI state to a second TCI state.

In some aspects, a network unit comprises: a memory; a transceiver; and at least one processor coupled to the memory and the transceiver, wherein the network unit is configured to: transmit first downlink control information (DCI) indicating a first transmission configuration indication (TCI) update; transmit second DCI indicating a second TCI update different than the first TCI update; receive a first acknowledgement (ACK) associated with the first DCI; receive a second ACK associated with the second DCI; and switch, based on a prioritizing of the first TCI update or the second TCI update, from a first TCI state to a second TCI state.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects, it should be understood that such exemplary aspects can be implemented in various devices, systems, and methods.

BRIEF DESCRIPTION OF THE DRAWINGS

FIG. 6A illustrates a beam indication communication scheme according to one or more aspects of the present disclosure.

FIG. 6B illustrates a beam indication communication scheme according to one or more aspects of the present disclosure.

FIG. 10B illustrates a beam indication communication scheme according to one or more aspects of the present disclosure.

DETAILED DESCRIPTION

Figure 1:
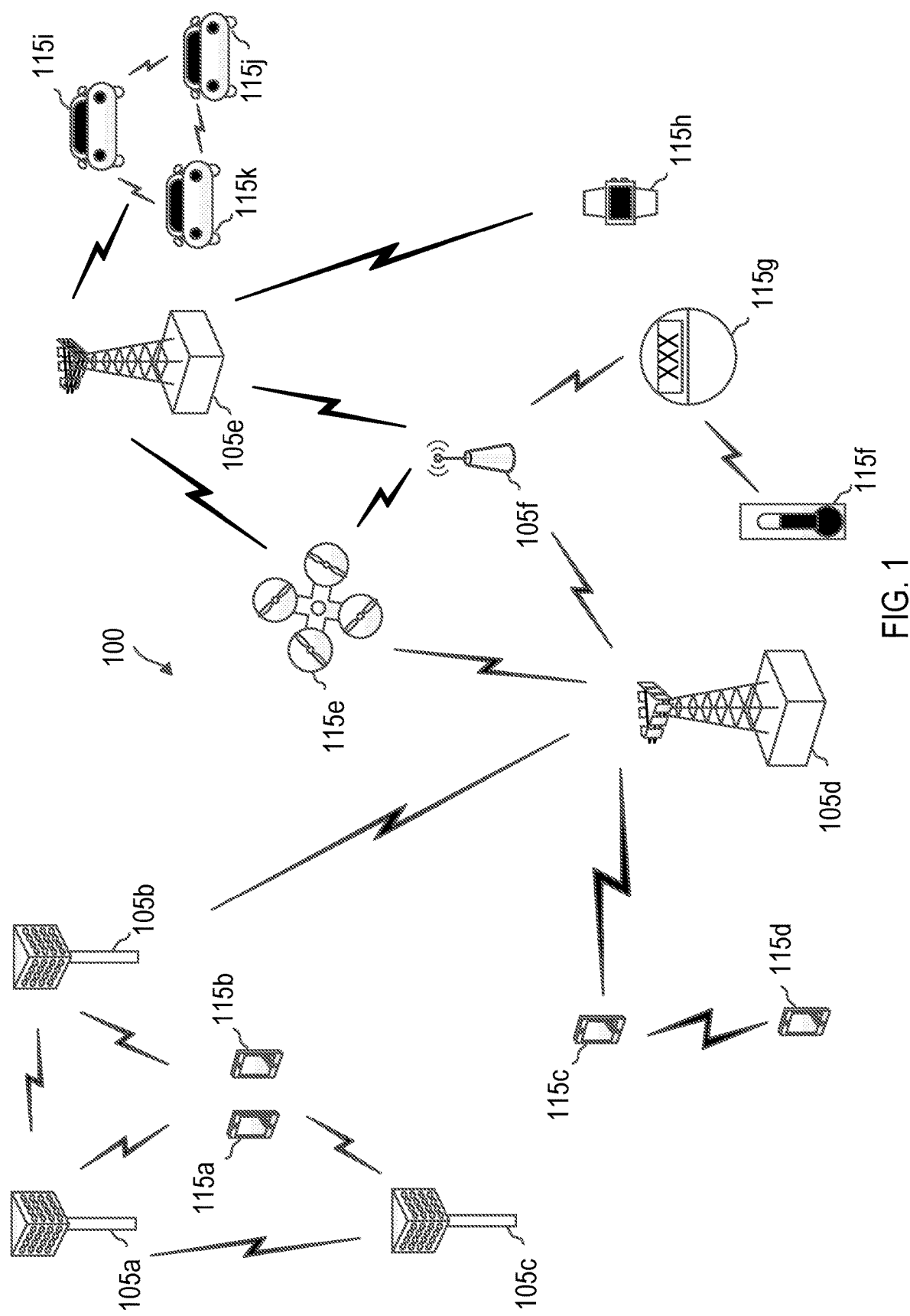
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For instance, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For instance, in various outdoor and macro coverage deployments of less than 3 GHz FDD/TDD implementations, subcarrier spacing may occur with 15 kHz, for instance over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For instance, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For instance, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For instance, a method may be implemented as part of a system, device, apparatus, and/or as instructions stored on a computer readable medium for execution on a processor or computer. Furthermore, an aspect may comprise at least one element of a claim.

The BS and the UE may use beam-specific reference signals to establish a beam pair (DL and UL) that can be used to transmit and receive DL/UL communications. In some aspects, the BS may indicate to the UE which beams are used for communication using transmission configuration indications (TCIs), which provide information about a beam and the channels/reference signals (RSs) the beam can be used for. The BS may configure the UE with a list or pool of TCIs, which may be referred to as TCI states, and their associated channels/RSs. In some instances, a TCI pool may include a range of TCI identifier (IDs), where each TCI ID may reference a configuration that associates beam information with certain signals (e.g., UL channel signal, DL channel signal, UL reference signal, DL reference signal). Further, the BS may dynamically request the UE to utilize a different DL beam and/or a different UL beam for communication. The BS may indicate the DL and/or UL beam by transmitting an indication of one or more TCIs and its associated channel/RS resources. That is, a TCI may include a TCI state corresponding to a particular beam.

The BS may activate a new TCI from a current TCI. For single-target communications, the BS may indicate, for each channel or reference signal, which TCI to use. For multi-target communications, the BS may indicate a TCI that can be used for a plurality of channels/RSs. The DL channels may include PDSCH, PDCCH, and/or PBCH. The UL channels may include PUCCH and/or PUSCH. The DL reference signals may include SSBs and/or CSI-RSs. The UL reference signals may include SRSs.

In some aspects, a wireless communication device, such as a network unit, may transmit more than one downlink control information (DCI) in separate communications. The more than one DCIs may include more than one transmission configuration indication (TCI) update. The more than one DCIs may or may not all schedule a data transmission. The UE may receive the DCIs, indicating the TCI updates, and switch to one or more of the new TCI states indicated in the TCI update. In some aspects, the rules for the UE to switch to one TCI update from among the one or more TCI update(s) is clearly defined based on the present disclosure. In some aspects, the UE (and/or the network unit) may be configured to prioritize the TCI updates and implement the highest priority TCI update from among the one or more TCI update(s).

Accordingly, the present disclosure illustrates various aspects to allow the UE to switch to one of the more than one TCI updates received by the UE. The UE may prioritize the TCI updates based on prioritizing the acknowledgements (ACKs) associated with the DCIs containing the TCI updates. For instance, the UE may prioritize the ACKs of the DCIs based on the reception times of the DCIs, the TCI values of the TCI updates; codebook positions of the ACKs, and/or transmission times for the transmitting the ACKs. In some instances, one or more of the DCIs may not schedule a data transmission (e.g., a PDSCH communication). In some instances, one or more of the DCIs may schedule a data transmission (e.g., a PDSCH communication). In some instances, at most 1 transport block (TB) can be transmitted in a slot. In some instances, at most two TBs can be transmitted in a slot. In some instances, a single DCI may schedule a plurality of PDSCH communications in one or more slots. In some instances, a PDSCH communication may include a plurality of codeblock groups and/or a plurality of data streams.

Aspects of the present disclosure advantageously provide methods for the UE to switch to a TCI state when a plurality of DCIs, indicating a plurality of TCI updates, are received by the UE. If a DCI does not schedule a data transmission, a virtual PDSCH (vPDSCH) may be indicated by the DCI and used to determine the location/timing of the acknowledge (ACK) of the DCI. The present disclosure provides methods to determine the rules that UE and BS follow in implementing TCI updates included in DCI. For example, the UE may determine the timing to transmit the ACKs of the DCIs based on one or more factors. In this regard, the factors may take into account one or more of PDSCH scheduling, vPDSCH scheduling, DCI transmission/reception times, locations of the ACKs in a HARQ codebook, TCI values indicated by the TCI updates, out-of-order rules, and/or other factors. In some instances, the UE can transmit a prioritized ACK for a particular DCI later in time (e.g., last) than ACKs for one or more other DCIs, and switch to the TCI state indicated by the particular DCI.

Aspects of the present disclosure provide several advantages over existing methods and systems, including clearly defining rules for implementing a particular TCI update when more than one TCI update is indicated via DCI communications. In this regard, by eliminating and/or reducing the need for repeated DCI communications to coordinate a TCI update, the techniques of the present disclosure can lead to more efficient utilization of network resources, reduce power consumption of both the UE and the network unit, provide an improved user experience, simplify the software implementation for determining TCI states, among other benefits.

FIG. 1 illustrates a wireless communication network 100 according to one or more aspects of the present disclosure. The network 100 may be a 5G network. The network 100 includes a number of BSs 105 (individually labeled as 105a, 105b, 105c, 105d, 105e, and 105o) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

In some aspects, the term "base station" (e.g., the base station 105) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the term "base station" or "network entity" may refer to one device configured to perform one or more functions, such as those described herein in connection with the base stations 105. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are instances of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are instances of various machines configured for communication that access the network 100. The UEs 115i-115k are instances of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an instance of a gNB or an access node controller (ANC)) may interface with the core network through backhaul links (e.g., NG-C, NG-U, etc.) and may perform radio configuration and scheduling for communication with the UEs 115. In various cases, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for instance, about 10. Each slot may be further divided into mini-slots. In a FDD mode, simultaneous UL and DL transmissions may occur in different frequency bands. For instance, each subframe includes a UL subframe in a UL frequency band and a DL subframe in a DL frequency band. In a TDD mode, UL and DL transmissions occur at different time periods using the same frequency band. For instance, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For instance, each DL or UL subframe may have pre-defined regions for transmissions of reference signals, control information, and data. Reference signals are predetermined signals that facilitate the communications between the BSs 105 and the UEs 115. For instance, a reference signal can have a particular pilot pattern or structure, where pilot tones may span across an operational BW or frequency band, each positioned at a pre-defined time and a pre-defined frequency. For instance, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some instances, the random access procedure may be a four-step random access procedure. For instance, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some instances, the random access preamble, the RAR, the connection request, and the connection response can be referred to as message 1 (MSG1), message 2 (MSG2), message 3 (MSG3), and message 4 (MSG4), respectively. In some instances, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For instance, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In some aspects, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For instance, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for instance, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). After receiving the DL data packet, the UE 115 may transmit a feedback message for the DL data packet to the BS 105. In some instances, the UE 115 may transmit the feedback on an acknowledgment resource. The feedback may be an acknowledgement (ACK) indicating that reception of the DL data packet by the UE 115 is successful (e.g., received the DL data without error) or may be a negative-acknowledgement (NACK) indicating that reception of the DL data packet by the UE 115 is unsuccessful (e.g., including an error or failing an error correction). In some aspects, if the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For instance, the BWP pair may include one BWP for UL communications and one BWP for DL communications.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
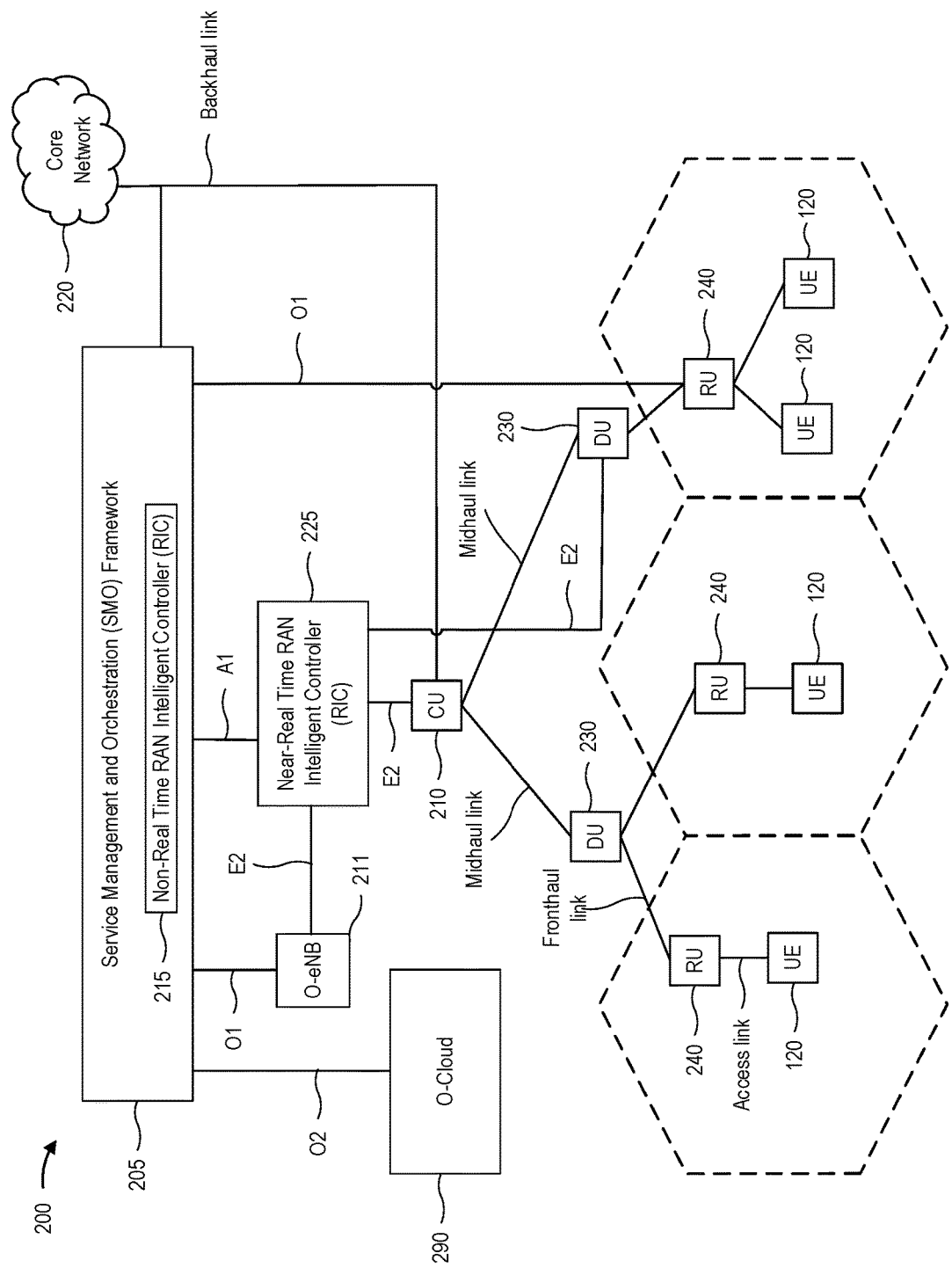
FIG. 2 illustrates a diagram of an example disaggregated base station architecture according to one or more aspects of the present disclosure.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 120 via one or more radio frequency (RF) access links. In some implementations, the UE 120 may be simultaneously served by multiple RUs 240.

Each of the units, i.e., the CUs 210, the DUs 230, the RUs 240, as well as the Near-RT RICs 225, the Non-RT RICs 215, and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 120. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
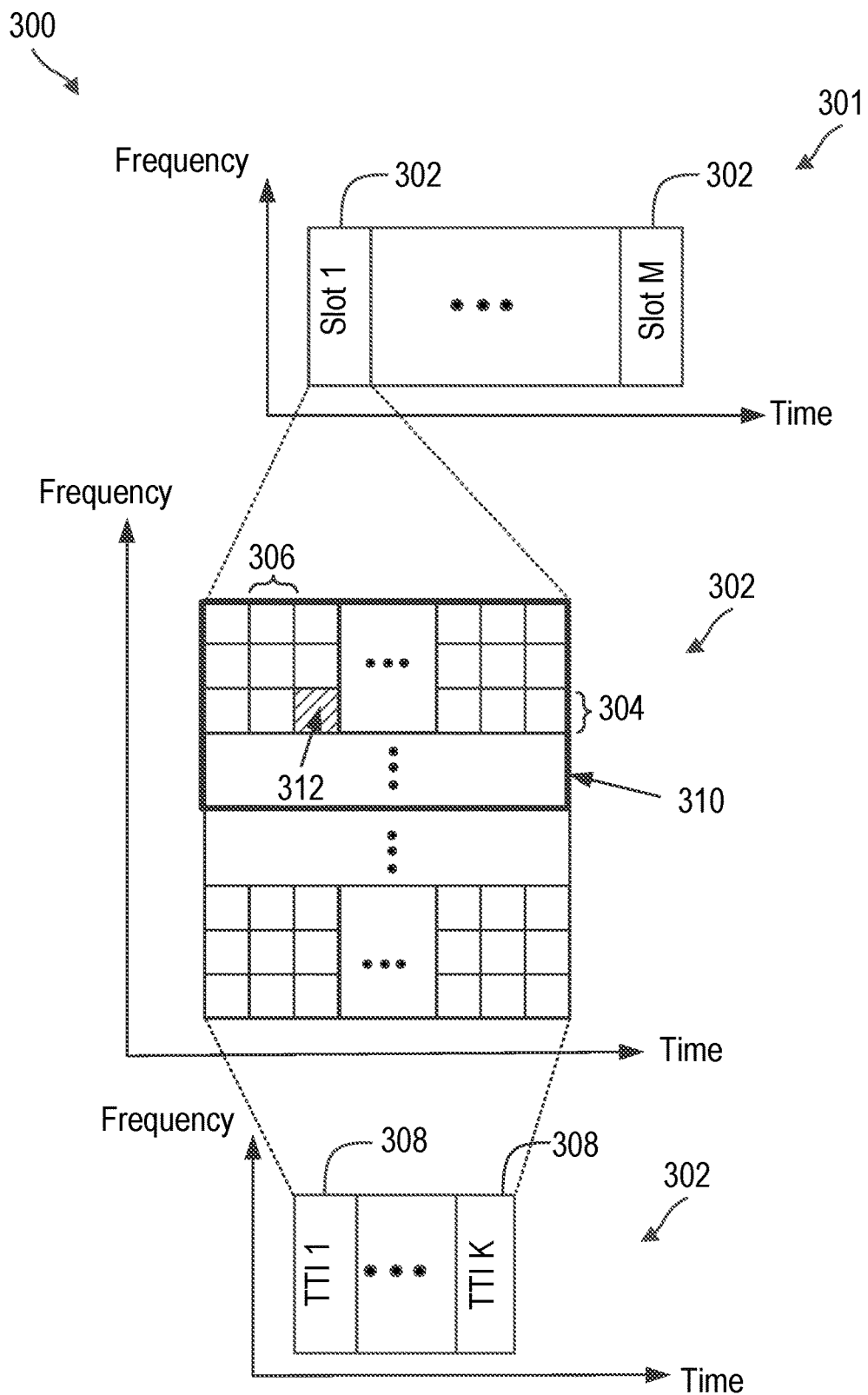
FIG. 3 is a timing diagram illustrating a radio frame structure according to one or more aspects of the present disclosure.

FIG. 3 is a timing diagram illustrating a radio frame structure 300 according to some aspects of the present disclosure. The radio frame structure 300 may be employed by BSs such as the BSs 105 and UEs such as the UEs 115 in a network such as the network 100 for communications. In particular, the BS may communicate with the UE using time-frequency resources configured as shown in the radio frame structure 300. In FIG. 3, the x-axes represent time in some arbitrary units and the y-axes represent frequency in some arbitrary units. The transmission frame structure 300 includes a radio frame 301. The duration of the radio frame 301 may vary depending on the aspects. In an example, the radio frame 301 may have a duration of about ten milliseconds. The radio frame 301 includes M number of slots 302, where M may be any suitable positive integer. In an example, M may be about 10.

Each slot 302 includes a number of subcarriers 304 in frequency and a number of symbols 306 in time. The number of subcarriers 304 and/or the number of symbols 306 in a slot 302 may vary depending on the aspects, for example, based on the channel bandwidth, the subcarrier spacing (SCS), and/or the CP mode. One subcarrier 304 in frequency and one symbol 306 in time forms one resource element (RE) 312 for transmission. A resource block (RB) 310 is formed from a number of consecutive subcarriers 304 in frequency and a number of consecutive symbols 306 in time.

In an example, a BS (e.g., BS 105 in FIG. 1) may schedule a UE (e.g., UE 115 in FIG. 1) for UL and/or DL communications at a time-granularity of slots 302 or TTIs 308. Each slot 302 may be time-partitioned into K number of TTIs 308. Each TTI 308 may include one or more symbols 306. The TTIs 308 in a slot 302 may have variable lengths. For example, when a slot 302 includes N number of symbols 306, a TTI 308 may have a length between one symbol 306 and (N−1) symbols 306. In some aspects, a TTI 308 may have a length of about two symbols 306, about four symbols 306, or about seven symbols 306. In some examples, the BS may schedule UE at a frequency-granularity of a resource block (RB) 310 (e.g., including about 12 subcarriers 304).

The BS 105 and the UE 115 may support a unified TCI framework based on DCI. In some aspects, the BS 105 may transmit a DCI indicating a unified TCI state. A unified TCI state may include, for instance, a joint DL/UL common TCI state indicating a common beam for at least one DL channel and at least one UL channel, a joint DL/UL common TCI state indicating a common beam for at least one DL reference signal and at least one UL reference signal, a separate DL common TCI state indicating a common beam for at least two DL channels, a separate DL common TCI state indicating a common beam for at least two DL reference signals, a separate UL common TCI state indicating a common beam for at least two UL channels, and/or a separate UL common TCI state indicating a common beam for at least two UL reference signals. The DL channels may include PDSCH, PDCCH, and/or PBCH. The UL channels may include PUCCH and/or PUSCH. The DL reference signals may include SSBs and/or CSI-RSs. The UL reference signals may include SRSs.

The BSs 105 and the UEs 115 may support joint and/or separate DL/UL beam indication(s) in the unified TCI framework. For instance, the BSs 105 and the UEs 115 may support Layer-1 (L1)-based beam indication using at least UE-specific (unicast) DCI or indicate joint or separate DL/UL beam indication from the active TCI states. In some aspects, the DCI may include a DCI in DCI format 1_1 or DCI format 1_2. For instance, the DCI format 1_1 and/or DCI format 1_2 may be reused for beam indication. The unified TCI framework may support a mechanism for the UE 115 to acknowledge successful decoding of a beam indication. In some aspects, the ACK/NACK of the PDSCH scheduled by the DCI carrying the beam indication may also be used as an ACK for the DCI.

The joint DL/UL common TCI state may include at least one source reference signal to provide a reference to the UE 115 for determining QCL and/or spatial filter information. The source reference signal(s) in M separate DL common TCI states may provide QCL information at least for UE-dedicated reception on PDSCH and for UE-dedicated reception on all or a subset of CORESETS in a CC, where M is a number greater than one. The source reference signal(s) in N separate UL common TCI states may provide a reference for determining a common UL transmission spatial filter(s) at least for dynamic-grant based PUSCH or configured-grant based PUSCH and/or all or a subset of dedicated PUCCH resources in a CC, where N is a number greater than one. In some aspects, the UL transmission spatial filter may apply to all SRS resources in resource set(s) configured for antenna switching, codebook-based UL transmissions, and/or non-codebook based UL transmissions.

In some aspects, a BS 105 may configure a UE 115 with TCI configurations, for example, via RRC configurations, to indicate association between beams and target signals. Examples of TCI configurations are provided in FIGS. 3 and 4. A target signal may be a certain channel signal (e.g., a PDCCH signal, a PDSCH signal, a PBCH signal, a PUCCH signal, a PUSCH signal) or a certain references signal (e.g., a CSI-RS, an SRS).

Figure 4:
FIG. 4 illustrates a transmission configuration indication (TCI) state table according to one or more aspects of the present disclosure.

FIG. 4 illustrates a TCI state table 400 according to one or more aspects of the present disclosure. In some aspects, the TCI state table 400 illustrates configuration of TCI states for single-target communications. In some aspects, the BS 105 may configure the UE 115 with the TCI state table 400. The UE may determine reference signal resource information and QCL information from the TCI state table 400. Each row in the TCI state table 400 provides references signal resource information and QCL type information for a certain TCI state. The references signal resource information may indicate the location of the time and/or frequency resources (e.g., symbols and/or subcarriers) where a BS 105 may transmit a respective references signal. The QCL type information may indicate a QCL type A, a QCL type B, a QCL type C, and/or a QCL type D. QCL type A may refer to doppler spread, doppler shift, delay spread, and/or average delay channel characteristics. QCL type B may refer to doppler shift and doppler spread channel characteristics. QCL type C may refer to average delay and doppler shift channel characteristics. QCL type D may refer to spatial receive parameters. Thus, when TCI state 0 defines the source reference signal(s) for a certain physical signal or channel (e.g., PDCCH), the UE 115 can configure its receive beam(s) in the same way it is configured for receiving the SSB with the index #n. Similarly, when TCI state 1 defines the source reference signal(s) for a certain physical signal or channel (e.g., PDCCH), the UE 115 can configure its receive beam(s) in the same way it is configured for receiving the CSI-RS with the index #k. When TCI state M−1 defines the source reference signal(s) for a certain physical signal or channel (e.g., PDCCH), the UE 115 can configure its receive beam(s) in the same way it is configured for receiving the SSB with the index #p. The UE 115 may configure its receive beams for UL transmission based on the TCI state(s) indicated by the BS 105. For instance, based on the TCI state table 400, the UE may transmit an UL communication using an SSB with index #n, CSI-RS with index #k, and SSB with index #p.

Figure 5:
FIG. 5 illustrates a TCI state table for multiple target communications according to one or more aspects of the present disclosure.

FIG. 5 illustrates a TCI state table 500 according to one or more aspects of the present disclosure. In particular, the TCI state table 500 illustrates configuration of TCI states for multi-target communications. In this regard, the TCI states shown in table 500 may include common joint and/or separate TCI states which can be used for a set of target channels and/or reference signals (RSs). In some aspects, the BS 105 may configure the UE 115 with the TCI state table 500. The UE may determine reference signal resource information and QCL information from the TCI state table 500. Each row in the TCI state table 500 provides references channel/signal resource information and QCL type information for each TCI state, which may be associated with TCI IDs having values from 0 to M. The channel/signal resource information may indicate the location of the time and/or frequency resources (e.g., symbols and/or subcarriers) where a BS 105 may transmit a respective references signal. The QCL type information may indicate a QCL type A, a QCL type B, a QCL type C, and/or a QCL type D, as explained above.

In the table 500, each TCI may be configured either as a common joint TCI, or as a common separate TCI. For example, the TCIs in the table 500 having the TCI value M is a common joint TCI, and the other TCIs are common separate TCIs. In this regard, the TCIs having IDs 0-2 are shown as being associated with either multiple DL channels/ signals, or multiple UL channels/signals. The TCI ID M is associated with a DL channel and a UL channel.

The TCI states shown in FIGS. 4 and 5 may be utilized in relation to FIGS. 8A-8C, 9, 10A, 10B and 11-13 as corresponding to the TCI updates.

FIGS. 6A and 6B respectively illustrate beam indication communication schemes 600 and 601 according to one or more aspects of the present disclosure. In the schemes 600 and 601, a network entity (e.g., BS 105, RU 240, DU 230, and/or CU 210) and a UE (e.g., UE 115) may operate in a channel over a frequency band. The network entity may include a BS. The BS may be an aggregated BS or a disaggregated BS, as described above. In FIGS. 6A and 6B, the x-axis represents time in some arbitrary units.

In the scheme 600 of FIG. 6A, the network entity may be configured to transmit downlink control information (DCI 1) 602 and schedule a physical downlink shared channel communication (PDSCH 1) 604. The DCI 1 602 may indicate a TCI update (e.g., TCI 1 608). The UE may receive the DCI 1 602 via a physical downlink control channel (PDCCH) or other suitable communications channel. The DCI 1 602 may be in any suitable DCI message format, including without limitation DCI 1_1 and DCI 1_2.

The TCI update of the DCI 1 602 may indicate to activate a new TCI state (TCI 1). For example, the TCI update of the DCI 1 602 may indicate to a switch from a current TCI state (e.g., TCI 0) to a different TCI state (e.g., TCI 1). The TCI update of the DCI 1 602 may provide updated information about one or more beams and/or channels/reference signals (RSs) associated with the one or more beams. For example, the TCI update of the DCI 1 602 may include information about different channels/RSs a beam can be used for other than the current channels/RSs. In some aspects, prior to receiving the TCI update of the DCI 1 602, the UE may receive a configuration for one or more TCIs. In some aspects, receiving the configuration for the one or more TCIs may include receiving an RRC configuration including one or more sets of TCIs. The RRC configuration may indicate, for each TCI state, the corresponding communication signals and/or reference signals, and/or the corresponding QCL states.

In some aspects, the DCI 1 602 may schedule one or more data transmissions in addition to indicating the TCI update. For example, the DCI 1 602 may schedule a single transport block (TB) in one slot, multiple TBs (multi-TBs) in one slot, a single PDSCH communication, multiple PDSCH communications in one or multiple slots, etc. Each TB may include one or more codeblock groups (CBGs). Each CBG may include one or more codeblocks. Each PDSCH communication may include a single TB or multiple TBs. As shown in FIG. 6A, in some instances, the DCI 1 602 schedules a single PDSCH communication (e.g., PDSCH 1).

The UE may transmit an ACK/NACK for the data transmission(s) scheduled by the DCI 1 602. As shown in FIG. 6A, in some instances, the UE may transmit an acknowledgement/negative-acknowledgment (A/N) (e.g., A/N 1) 606 for the DCI 1 602. The UE may transmit the ACK/NACK in a physical uplink shared channel (PUSCH) and/or the physical uplink control channel (PUCCH). The UE may utilize a Type-1 HARQ-ACK codebook and/or a Type-2 HARQ-ACK codebook for transmitting the ACK/NACK. In some aspects, the UE may transmit one ACK/NACK bit as a hybrid automatic repeat request (HARQ) feedback (e.g., 1 for ACK or 0 for NACK) of a PDSCH communication, a TB, and/or a CBG. In some aspects, the UE may transmit one ACK/NACK bit for each CBG in a TB as the HARQ feedback for the CBGs of a TB. In some aspects, the UE may transmit one ACK/NACK bit for each PDSCH communication of a plurality of scheduled PDSCH communications as the HARQ feedback for the plurality of PDSCH communications. In some instances, the ACK/NACK associated with the data transmission(s) scheduled by the DCI 1 602 may serve as an ACK/NACK for the TCI update indicated by the DCI 1 602. In some aspects, if the UE transmits an ACK for any PDSCH communication scheduled by the DCI 1 602, the network unit receiving the ACK for the PDSCH communication may treat the received ACK as an ACK for the TCI update indicated by the DCI 1 602. For example, if the UE transmits an ACK for a scheduled TB and/or PDSCH communication (e.g., PDSCH 1), then the network unit receiving the ACK for the scheduled TB and/or PDSCH communication may treat the received ACK as an ACK for the TCI update of the corresponding DCI as well. Further, in some instances if the UE transmits an ACK for one or more CBGs of multiple CBGs of a TB, one or more PDSCH communications of multiple scheduled PDSCH communications, one or more data streams of multiple scheduled data streams, or otherwise transmits an ACK for one or more data transmissions scheduled by the DCI 1 602, the ACK may also serve as the ACK of the TCI update indicated by the DCI 602.

Figure 6C:
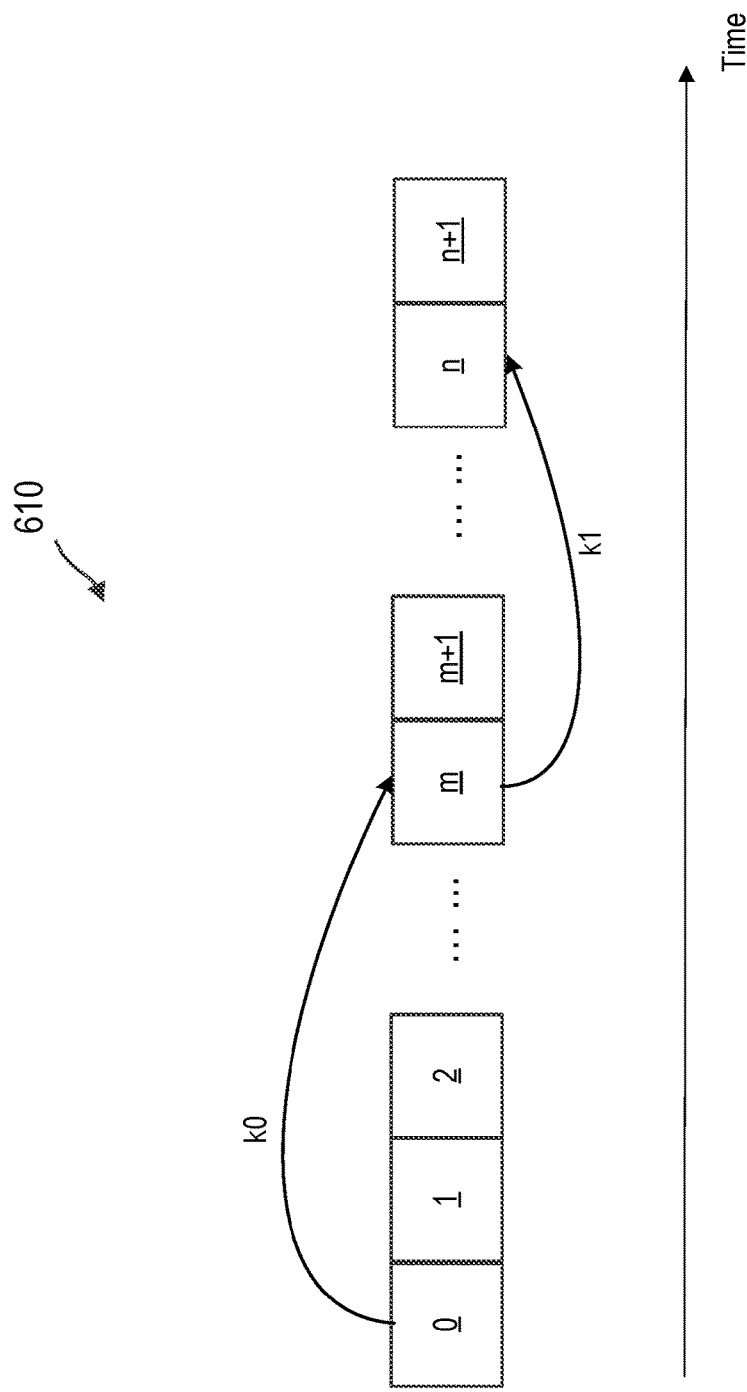
FIG. 6C illustrates a physical layer time domain resource allocation according to one or more aspects of the present disclosure.

In some aspects, the DCI 1 602 may indicate a location of the PDSCH 1 604 and/or a location of the A/N 1 606. As shown in FIG. 6C, the DCI 602 may include an offset indicator k0 and/or an offset indicator k1. The offset indicator k0 may indicate the offset between the slot (e.g., slot 0) the DCI 1 602 is transmitted/received in and the slot (e.g., slot m) the PDSCH 1 604 is scheduled. The offset indicator k1 may be based on the location of the PDSCH (e.g., PDSCH 1 604). In this regard, the offset indicator k1 may be predefined and/or preconfigured based on the location of the PDSCH. In this regard, the offset indicator k1 may indicate the offset between the slot the PDSCH 1 604 is scheduled and the slot (e.g., slot n) the A/N 1 606 is to be transmitted by the UE. The UE can thus determine the location/slot of the A/N 1 606 in the time domain.

After transmitting the A/N 1 606, the UE may switch to the new TCI state (TCI 1 608). The time between the A/N 1 606 and using the new TCI state (TCI 1 608) may be equal to a beam application time (BAT). The BAT can be a predetermined time period. In some instances, the BAT may be based, at least in part, on a beam switching time of the UE. In some aspects, the BAT may be predetermined based on a smallest subcarrier spacing of a plurality of component carriers. In some aspects, a timing for the switching from a current TCI state to the new TCI state is based on the BAT associated with at least one active bandwidth part of one or more component carriers.

In the scheme 601, the network entity is configured to transmit a DCI 2 603 that does not schedule any PDSCH communications. The DCI 2 603 may indicate a TCI update (e.g., TCI 2 609). The UE may receive the DCI 2 603 via a physical downlink control channel (PDCCH) or other suitable communications channel. The DCI 2 603 may be in any suitable DCI message format, including without limitation DCI 1_1 and DCI 1_2. Similar to the TCI update of the DCI 1 602, the TCI update of the DCI 2 603 may indicate to activate a new TCI state as discussed above.

In some aspects, the DCI 2 603 may not schedule any data transmissions along with indicating the TCI update. For example, the DCI 2 603 may be provided by the network unit to indicate to the UE the TCI update without scheduling any data transmissions. In this regard, the content of one or more fields of the DCI 2 603 may indicate that the DCI 2 603 is providing the TCI update without scheduling any data transmissions. For example, the cyclic redundancy check (CRC) of the DCI 2 603 can be scrambled by a configured scheduling (CS)—radio network temporary identifier (RNTI), and certain fields in the DCI 2 603 can be set to certain values (e.g., redundancy version (RV)=1, (modulation and coding scheme) MCS=1, new data indicator (NDI) =0, (frequency domain resource assignment) FDRA=0 (for FDRA type 0 and dynamicSwitch, or 1 for FDRA type 1)) to indicate that the DCI 2 603 is not scheduling a data transmission and/or the DCI 2 603 is providing the TCI update. In other instances, the DCI 2 603 may use other parameters and/or values to indicate that no data transmission is scheduled and/or that a TCI update is being provided. The TCI field in the DCI 2 603 may indicate a TCI state identification (ID) associated with the TCI 2 609.

In some aspects, when the DCI 2 603 does not schedule a data communication, the UE may utilize the Type-1 HARQ-ACK codebook and/or the Type-2 HARQ-ACK codebook in a similar manner as to when the DCI 2 603 schedules one or more data communications. For example, if a UE provides HARQ-ACK information corresponding to detection of a DCI format that provides a TCI state update without scheduling a PDSCH communication reception, a location in the Type-1 HARQ-ACK codebook for the HARQ-ACK information may be the same as when the DCI format schedules a PDSCH reception with CBGs or with transport blocks that are correctly decoded. In this manner, when DCI 2 603 does not schedule a data communication, a virtual PDSCH 2 605 (vPDSCH) may be utilized to determine the resources utilized for the ACK/NACK associated with the DCI 2 603. That is, a vPDSCH, which is not a scheduled DL communication, may be used to determine a location of an ACK associated with a DCI that does not schedule a data communication. In this manner, the ACK associated with the vPDSCH may be utilized to indicate to the network unit that the UE successfully received the TCI update indicated by DCI that does not otherwise schedule a data communication.

In scheme 601, the DCI 2 603 may include an indication of a location of the virtual PDSCH 2 605. In some aspects, the time domain resource assignment (TDRA) field of the DCI 2 603 may be used to indicate a location of the virtual PDSCH 2 605. In some aspects, the UE may receive the DCI 2 603 in a first slot and transmit an ACK, i.e., A/N 2 607 associated with the DCI 2 603 in a second slot different from the first slot. The second slot may be offset from the first slot based on an offset indicator (e.g., k1). The offset indicator (k1) may be included in or indicated by the DCI 2 603 or otherwise be known by the UE and/or network unit. In some aspects, the location of the virtual PDSCH 2 605 may be based on the location of the A/N 2 607. In this regard, if the UE receives the DCI 2 603 in the first slot and transmits the A/N 2 607 in a second slot based on an offset indicator (e.g., k1), then the virtual PDSCH 2 605 may be scheduled between the first slot and the second slot based on another offset indicator (e.g., k0) relative to the first slot. In some instances, the offset indicator associated with the virtual PDSCH 2 605 may be equal to 0 such that the virtual PDSCH 2 605 is scheduled in the slot immediately following the slot in which the DCI 2 603 is transmitted. In other instances, the slot associated with the virtual PDSCH 2 605 may be offset from the first slot of the DCI 2 603 by one or more other slots. In some instances, the difference between the offset (e.g., k1) associated with the A/N 2 607 and the offset associated with the virtual PDSCH 2 605 (e.g., k0) may be among the set of available offset slot timing values (e.g., k1) associated with the A/N 2 607. The set of available slot timing values (e.g., k1) may be provided to the UE in an RRC list or other suitable communication. In some instances, the TDRA field may indicate a value of an offset (e.g., k0) that represents the offset between the DCI 2 603 to the virtual PDSCH 2 605. The PDSCH-to-HARQ feedback timing indicator in the DCI 2 603 may indicate a value of a time offset (e.g., k1) from the DCI 2 603 to the A/N 2 607 in the PUCCH. In some instances, the difference between k1 and k0, e.g., (k1−k0) may be a proper value of an offset between a scheduled PDSCH and an associated ACK.

Figure 7A:
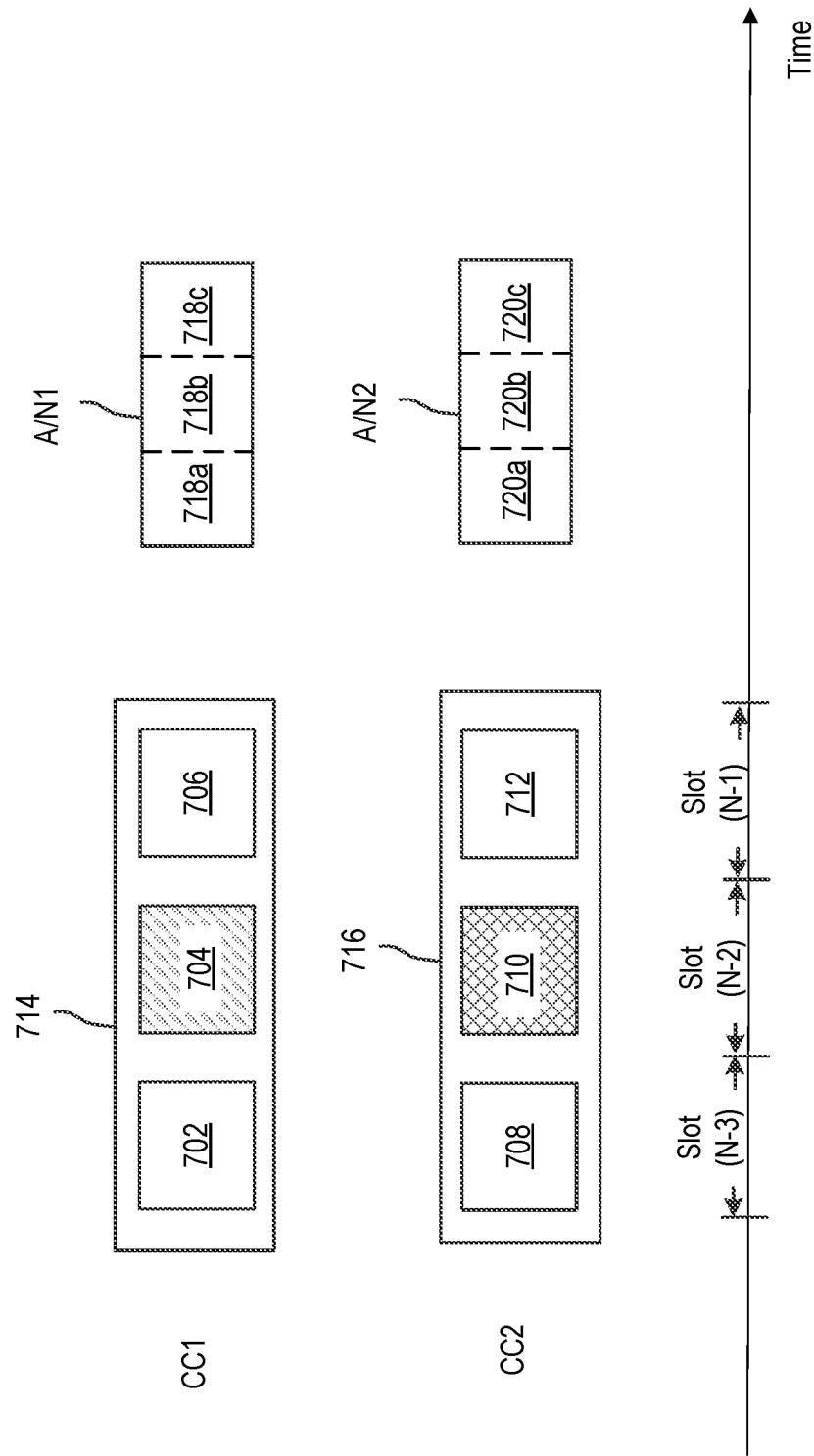
FIG. 7A illustrates a beam indication communication scheme according to one or more aspects of the present disclosure.

FIG. 7A illustrates an example of a type-1 HARQ-ACK codebook according to one or more aspects of the present disclosure. In some aspects, the UE may transmit ACK/NACK feedback for slots potentially used for scheduling PDSCH communication. If a PDSCH communication is successfully received, the UE may transmit an ACK (e.g., one or more ACK bits) for the slot associated with the PDSCH communication. If a PDSCH communication is not successfully received in a slot, the UE may transmit a NACK (e.g., one or more NACK bits) for the slot. In the same carrier component (CC) or the same bandwidth part (BWP), the same number of ACK/NACK bits may be used for each slot.

For example, the BS may transmit PDSCH communications in CC1 and CC2. CC1 may be configured for codebook group (CBG) HARQ feedback. PDSCH communications 702, 704, and 706 (collectively PDSCH communications 714) may be transmitted in slot (N−3), slot (N−2), and slot (N−1), respectively. In some aspects, a maximum of 4 CBGs may be transmitted in one slot, and the UE transmits 4 ACK/NACK bits for the ACK/NACK feedback for one slot. If fewer CBGs are scheduled in one slot, the UE may fill the NACK bits for the CBGs not scheduled. In an example, PDSCH communication 702 represents a PDSCH communication where the first and second CBGs failed to be received and/or decoded, while the third and fourth CBGs were successfully received and decoded. PDSCH communication 704 represents a non-scheduled PDSCH communication. That is, no PDSCH communication is scheduled for slot N−2 in CC1 PDSCH communication 706 represents a PDSCH communication having only two CBGs and where the first and second CBGs were successfully received and decoded. The type-1 HARQ-ACK codebook feedback (i.e., A/N 1) of slots (N−3), (N−2), and (N−1) may be represented by 718*a*, 718*b*, and 718*c*. In accordance with the PDSCH communications 702, 704, and 706 provided above, the values of 718*a*, 718*b*, and 718*c* may respectively be, 0011, 0000, 1100. It is understood that other CBG sizes (e.g., 1, 2, 3, 4, 6, 8, etc.) and associated HARQ feedback formats may be utilized in accordance with the present disclosure.

Meanwhile, CC2 may be configured as one transport block (TB) per slot/TTI, and the UE transmits one ACK/NACK bit per slot. PDSCH communications 708, 710, and 712 (collectively PDSCH communications 716) may potentially be transmitted in slot (N−3), slot (N−2), and slot (N−1). In an example, PDSCH communication 708 represents a PDSCH communication successfully received and decoded by the UE, PDSCH communication 710 represents a PDSCH communication associated with a DCI that was missed by the UE (and therefore the PDSCH communication 710 was not received and/or decoded the UE), and PDSCH communication 712 represents a PDSCH communication successfully received and decoded by the UE. In accordance with the PDSCH communications 708, 710, and 712 provided above, the type-1 HARQ-ACK codebook feedback (i.e., A/N 2) of slots (N−3), (N−2), and (N−1) may respectively be represented by 720*a*, 720*b*, and 720*c*. The values of 720*a*, 720*b*, and 720*c* may respectively be, 1, 0, 1.

Figure 7B:
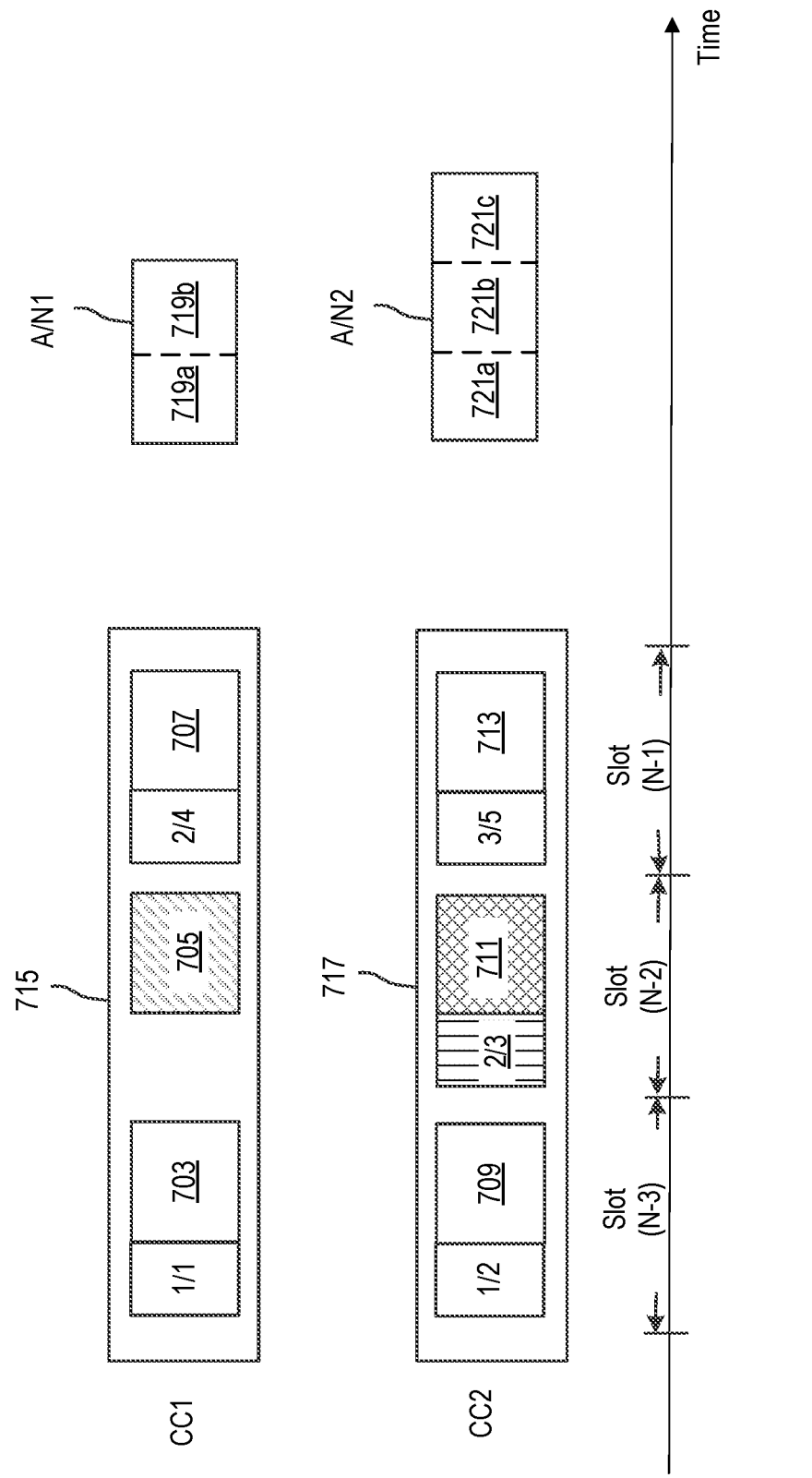
FIG. 7B illustrates a beam indication communication scheme according to one or more aspects of the present disclosure.

FIG. 7B illustrates examples of type-2 HARQ-ACK codebook according to one or more aspects of the present disclosure. In some aspects, the UE may transmit ACK/NACK feedback only for slots associated with scheduled PDSCH communications. If a PDSCH communication is successfully received, then the UE may transmit an ACK (e.g., one or more ACK bits) for the slot associated with the PDSCH communication. If a PDSCH communication is not scheduled in a slot, then UE may not send an ACK//NACK for the slot. The UE may employ downlink assignment index (DAI) to ACK/NACK all potential slots for scheduling PDSCH communications. DAI may correspond to a field in the DCI and may count the number of PDSCH communications that the UE should ACK/NACK in the same ACK/NACK occasion. For carrier aggregation, the DAI field may correspond to two counters, which are a total DAI and a counter DAI, respectively. The total DAI and the counter DAI may allow the UE to identify a missed DCI and provide an associated NACK.

For example, the BS may transmit PDSCH communications in CC1 and CC2. In some instances, the BS may transmit DAI with the DCI scheduling the PDSCH communications. In this regard, the DAI may have a format of counter DAI/total DAI. In the illustrated scenario of FIG. 7B, no DAI may be assigned to PDSCH communication 705 that is associated with no PDSCH communication being scheduled for slot N−2 in CC1. Because five transmissions are scheduled in slots (N−3), slot (N−2), and slot (N−1), the DAI for the DCIS associated with PDSCH communications 703, 709, 711, 707, and 713 may respectively be 1/1, 1/2, 2/3, 2/4, and 3/5.

The type-2 HARQ-ACK codebook feedback (i.e., A/N 1) of slots (N−3) and (N−1) may respectively be represented by 719*a* and 719*b*. The type-2 HARQ-ACK codebook feedback (i.e., A/N 2) of slots (N−3), (N−2), and (N−1) may respectively be represented by 721*a*, 721*b*, and 721*c*. In an example, PDSCH communication 703 represents a PDSCH communication where the first and second CBGs failed to be received and/or decoded, while the third and fourth CBGs were successfully received and decoded. PDSCH communication 705 represents a non-scheduled PDSCH communication. That is, no PDSCH communication is scheduled for slot N−2 in CC1 PDSCH communication 707 represents a PDSCH communication having only two CBGs and where the first and second CBGs were successfully received and decoded. PDSCH communication 709 represents a PDSCH communication successfully received and decoded by the UE. PDSCH communication 711 represents a PDSCH communication associated with a DCI that was missed by the UE (and therefore the PDSCH communication 711 was not received and/or decoded the UE). PDSCH communication 713 represents a PDSCH communication successfully received and decoded by the UE. In accordance with the PDSCH communications 703, 707, 709, 711, and 713 provided above, the values of A/N1 (719*a* and 719*b*) and A/N2 (721*a*, 721*b*, and 721*c*) may respectively be 0011, 1100, 1, 0, 1. The values of 721*a*, 721*b*, and 721*c* may respectively be, 1, 0, 1.

FIGS. 8A-8C, 9, 10A, 10B, 11, 12, and 13 illustrate scenarios for implementing a TCI update indicated by a DCI according to one or more aspects of the present disclosure. For ease of illustration, elements illustrated in schemes 600 and 601 of FIGS. 6A and 6B are used to illustrate the scenarios in FIGS. 8A-8C, 10A, 10B, 11, and 12. Specifically, DCI 1 602 may indicate a TCI update (e.g., TCI 1 608)

and schedule a PDSCH communication (e.g., PDSCH 1 604) and DCI 2 may indicate a TCI update (e.g., TCI 2 609) without scheduling a data transmission (e.g., no scheduled PDSCH communication). The detailed description of DCI 602, DCI 2 603, PDSCH 1 604, virtual PDSCH 2 605, TCI 1 608, and/or TCI 2 609 may be referred to above and is not repeated for sake of brevity. It should be noted that, the scope of the present disclosure should not be limited by the examples of the present disclosure. In some examples, although not shown in the figures, DCI 1 and DCI 2 may both schedule data transmissions (e.g., PDSCH communications), or neither of DCI 1 and DCI 2 may schedule a data transmission. For example, the scenarios illustrated in FIGS. 9, 10A, 10B, 11, 12, and 13 may also apply when neither or both of DCI 1 and DCI 2 schedule a data transmission.

Figure 8A:
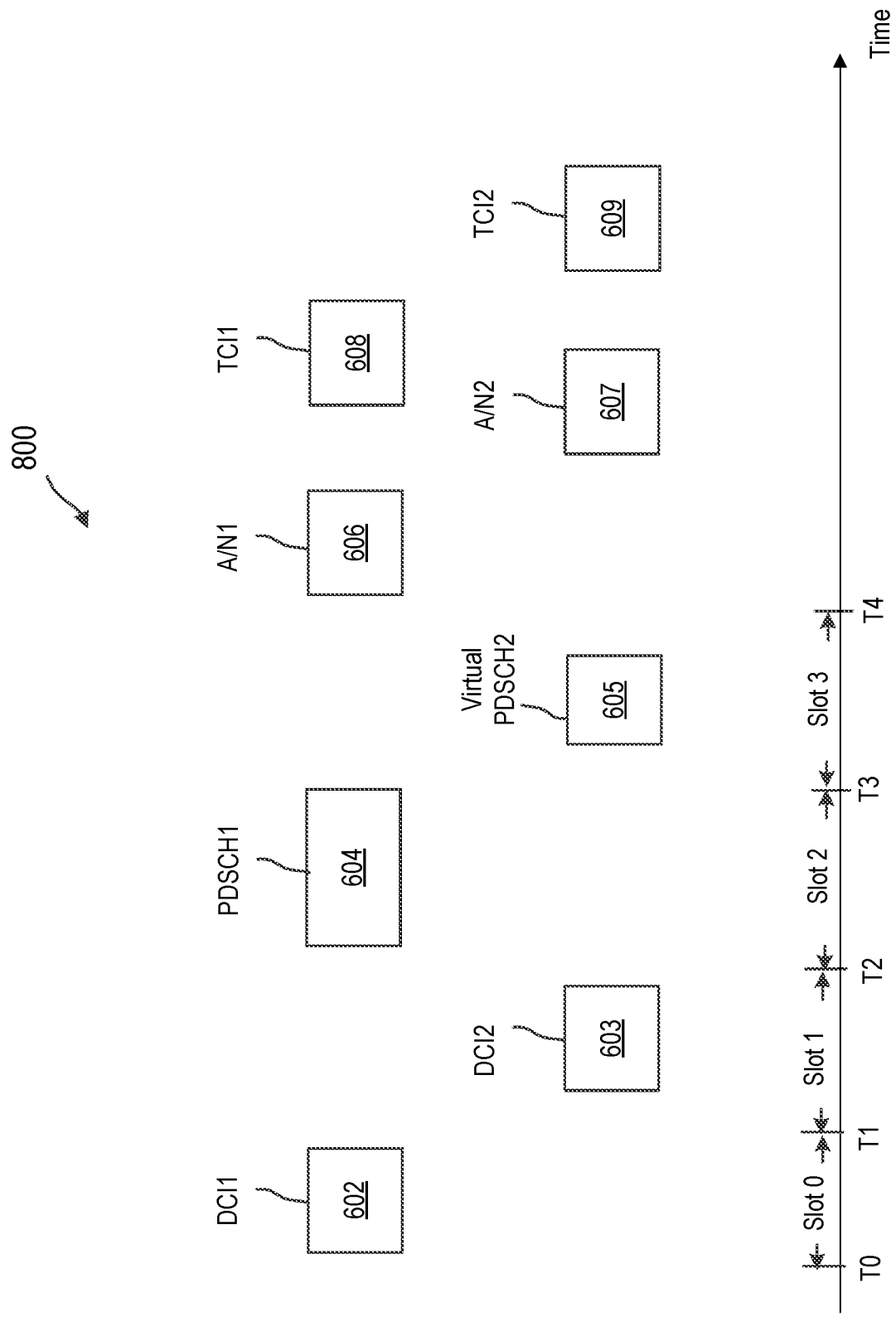
FIG. 8A illustrates a beam indication communication scheme according to one or more aspects of the present disclosure.
Figure 8B:
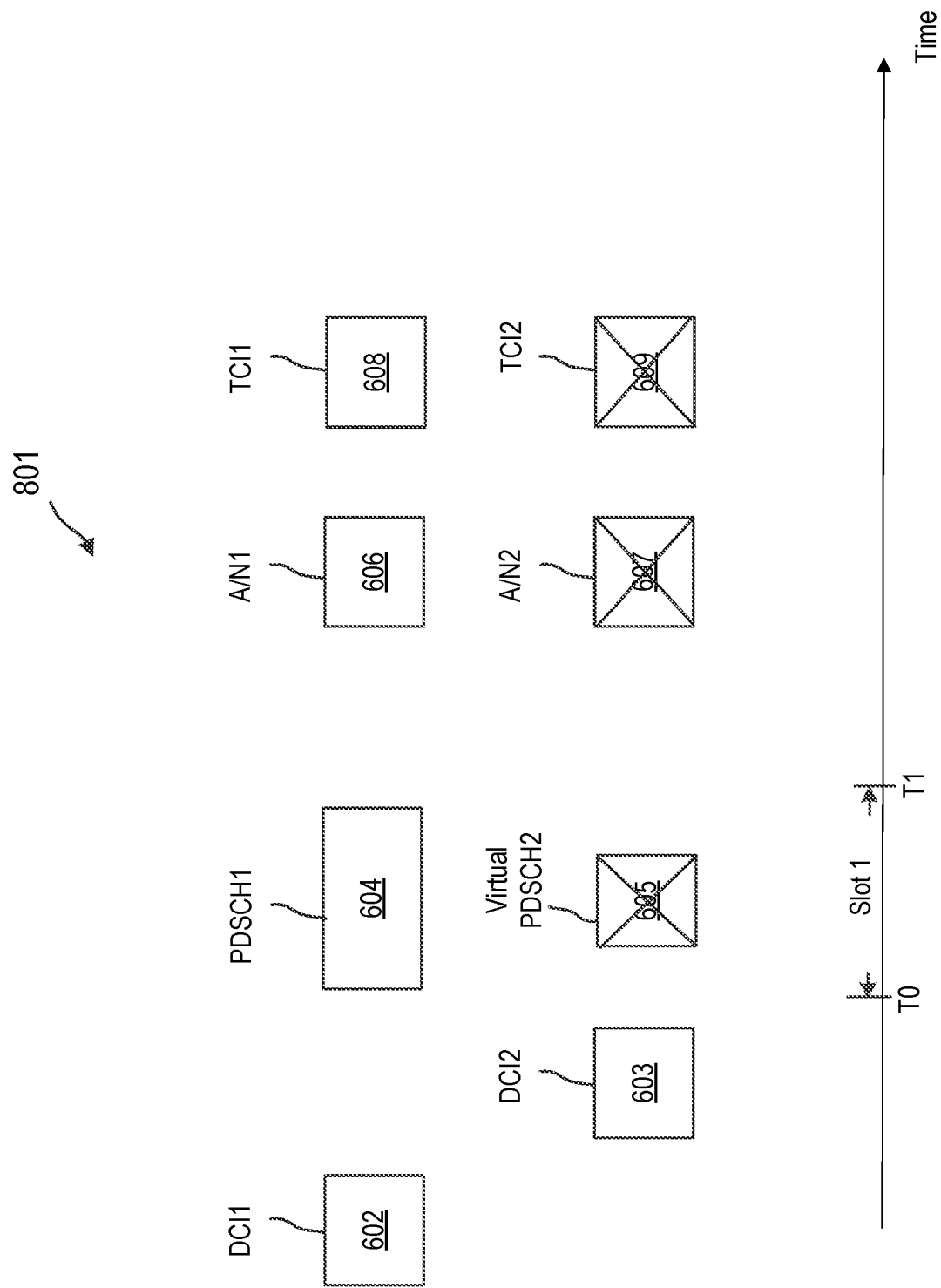
FIG. 8B illustrates a beam indication communication scheme according to one or more aspects of the present disclosure.

FIGS. 8A and 8B illustrate scenarios for implementing a TCI update when at most one transport block (TB) can be scheduled in a slot for a component carrier (CC), according to one or more aspects of the present disclosure. The scenario 800 is illustrated in FIG. 8A, while FIG. 8B illustrates a scenario 801. The UE may transmit one ACK/NACK bit for the ACK/NACK (e.g., A/N 1 606) of one slot as a type-1 HARQ feedback for the DCI 1 602. In some aspects, the UE may transmit the one ACK/NACK bit indicating the A/N 2 using ACK/NACK resources associated with the slot in which the DCI 2 603 is received. In some aspects, the derived location of the virtual PDSCH 2 605, indicated in the DCI 2 603, may be in a different slot than the PDSCH 1 604, as shown in FIG. 8A. For example, the UE may receive an indication (e.g., in the DCI 2 603) that the derived location of the virtual PDSCH 2 605 is in a slot (e.g., slot 3, k0=1) that is different from the slot (e.g., slot 2) that the PDSCH 1 604 is scheduled for. In other words, the derived location of the virtual PDSCH 2 605 may be different from the location of the PDSCH 1 604. In some instances, the UE does not expect a vPDSCH (vPDSCH 2 605) to be scheduled in the same slot as another PDSCH communication (e.g., PDSCH 1) when at most one TB can be scheduled in a slot for a CC. Accordingly, as shown in FIG. 8B, in some instances a rule may prevent a network unit from scheduling a vPDSCH in the same slot of a CC where another PDSCH communication is scheduled (as indicated by the Xs through vPDSCH 2 605, A/N 2 607, and TCI 2 609). If the derived location of the virtual PDSCH 2 605 is in the same slot as the PDSCH 1 604 and only one TB can be scheduled per CC per slot, then the UE may determine an error has occurred.

In some aspects, the offset (e.g., k0) between the derived location of the virtual PDSCH 2 605 and the location of the DCI 2 603 may be 0. Thus, the derived location of the virtual PDSCH 2 605 and the location of the DCI 2 603 may be adjacent slots. In other words, when k0 is equal to zero, the UE may not receive the DCI 2 603 in the same slot as the PDSCH 1 604 or an immediately preceding slot to PDSCH 1 604 if only one TB can be scheduled per CC per slot. The UE may receive the DCI 2 603 in a different slot than the PDSCH 1 604.

Figure 8C:
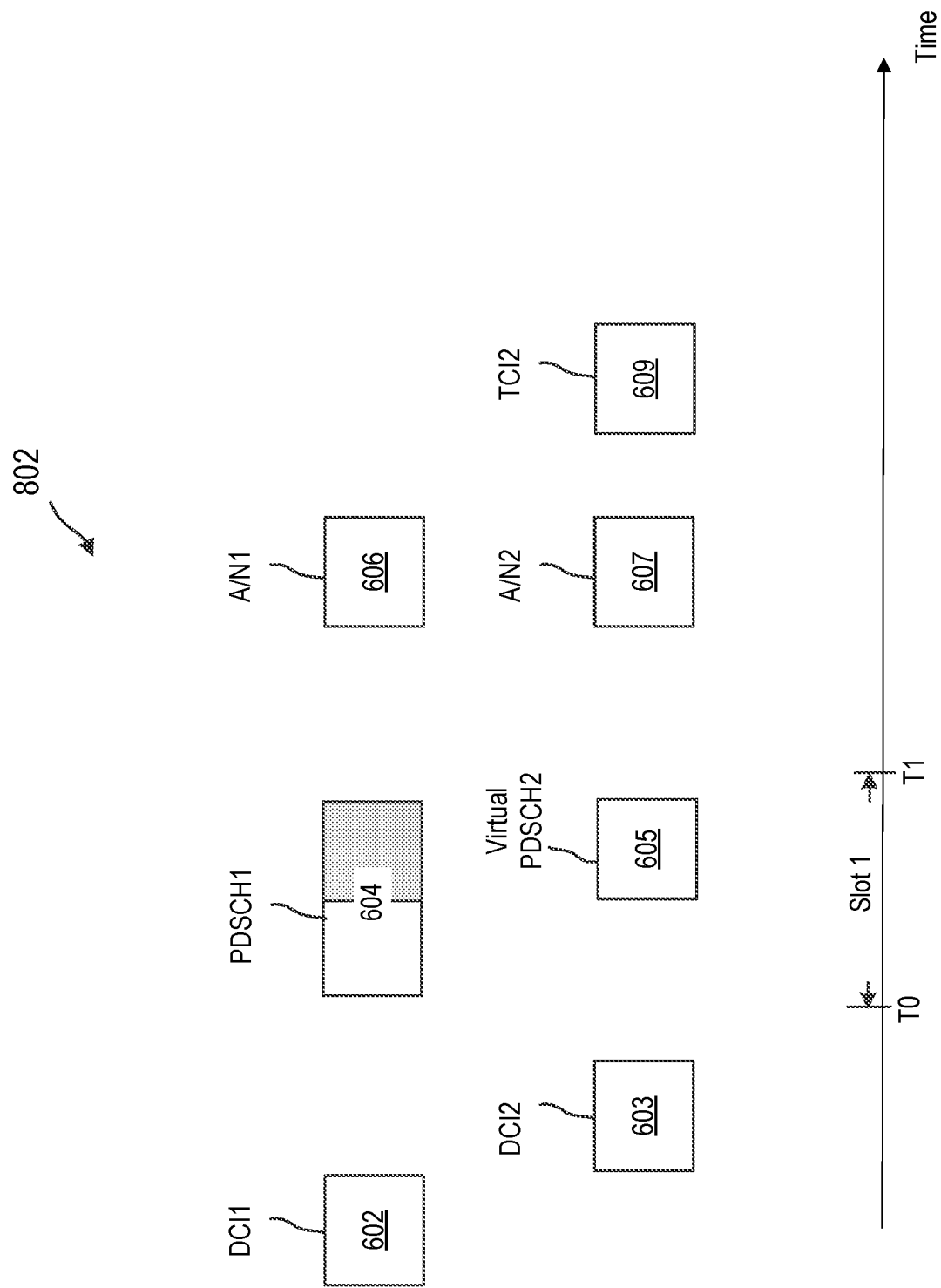
FIG. 8C illustrates a beam indication communication scheme according to one or more aspects of the present disclosure.

FIG. 8C illustrates a scenario 802 for implementing a TCI update of a DCI when at most two TBs can be scheduled in a slot for a component carrier (CC), according to one or more aspects of the present disclosure. The UE may transmit two ACK/NACK bits for the ACK/NACK of one slot. In some aspects, the UE may transmit a communication that includes a first ACK/NACK bit indicating the ACK/NACK of PDSCH communication (e.g., A/N 1 606), and a second ACK/NACK bit indicating the ACK/NACK of a vPDSCH (e.g., A/N 2 607). The two ACK/NACK bits may be included in a common HARQ feedback message transmitted by the UE to a network unit. In some instances, the network may schedule a PDSCH communication (PDSCH 1 604) that occupies only one of the two TBs of a slot for a CC. Accordingly, the network unit may schedule transmit a DCI (e.g., DCI 2 603) indicating a TCI update (e.g., TCI 2 609) that schedules a vPDSCH (e.g., vPDSCH 2 605) to occupy the remaining TB of the slot. For example, the derived location of the virtual PDSCH 2 may be slot 1 and the PDSCH 1 604 may also be received by the UE in the slot 1. The UE may transmit two ACK/NACK bits for the ACK/NACK of the slot (e.g., slot 1). The two ACK/NACK bits may include one ACK/NACK bit (e.g., A/N 1 606) for the PDSCH 1 and another ACK/NACK bit (e.g., A/N 2 607) for the vPDSCH 2. The UE may switch to the new TCI state (e.g., TCI 2 609) indicated by DCI 2 603 after transmitting the A/N 2 607. In some instances, the DCI 1 602 may also include an indication of a TCI update. In such instances, the UE and/or network unit may prioritize the TCI update associated with either DCI 1 602 or DCI 2 603 in accordance with one or more aspects of the present disclosure and implement the prioritized TCI update (e.g., either TCI 1 608 or TCI 2 609).

Figure 9:
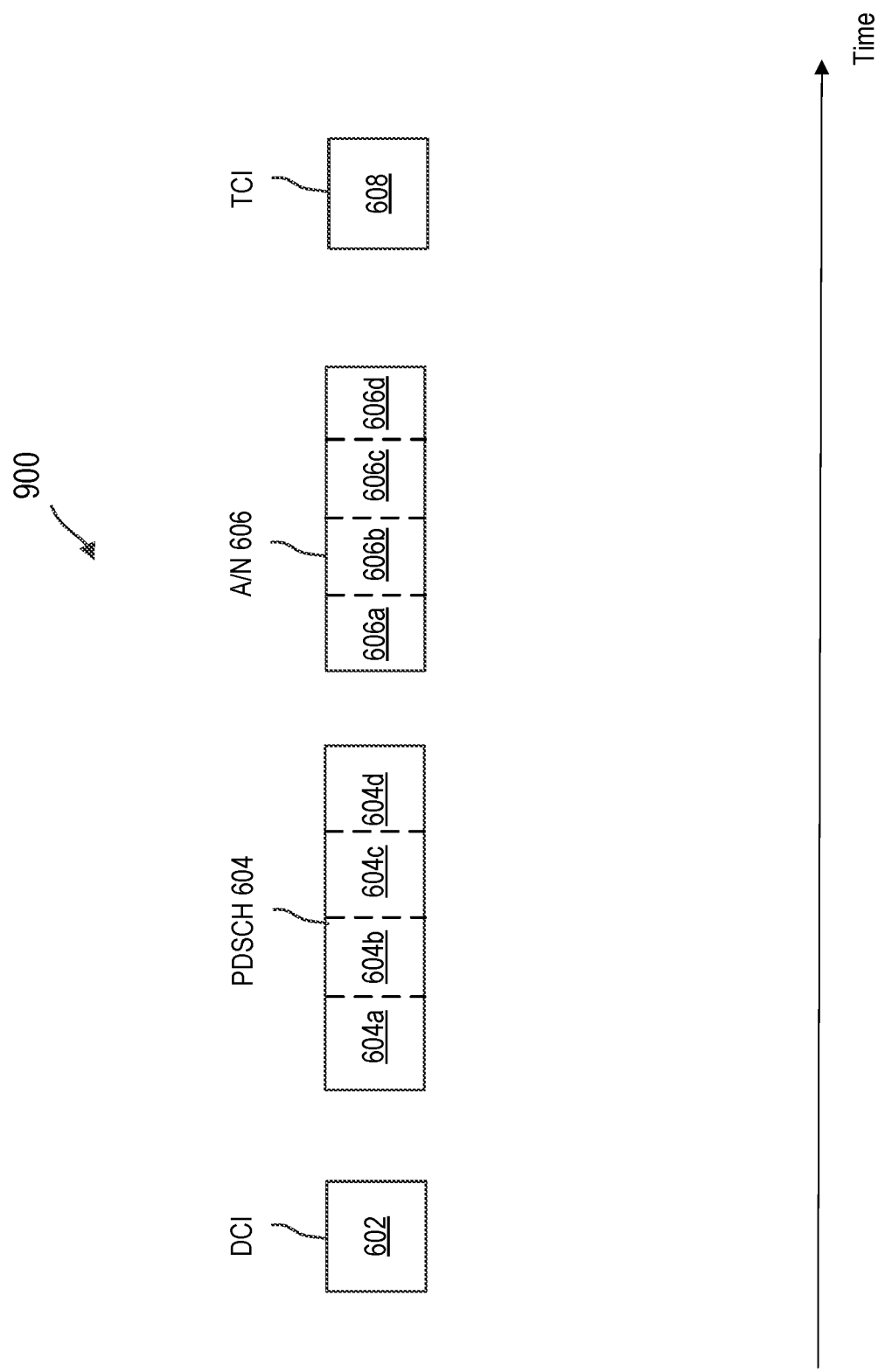
FIG. 9 illustrates a beam indication communication scheme according to one or more aspects of the present disclosure.

FIG. 9 illustrates a scenario 900 for implementing a TCI update of a DCI when the DCI schedules a PDSCH communication that includes a plurality of codeblock groups (CBGs), according to some aspects of the present disclosure. The DCI 602 may be an example of one or both of DCI 1 602 and/or DCI 2 603 in FIGS. 6A and 6B. In some aspects, the UE may receive the DCI 602 (e.g., at least one of DCI 1 602 an DCI 2 603) that indicates a TCI update (e.g., TCI 608) and schedules a data transmission (e.g., PDSCH 604) and/or a virtual PDSCH. The PDSCH communication (e.g., PDSCH 604 and/or a vPDSCH) may include one or more codeblock groups (CBGs) (e.g., 604a, 604b, 604c, 604d, etc.) and/or be associated with a CBG HARQ feedback. Each of the CBG (e.g., 604a, 604b, 604c, 604d) may include one or more codeblocks. In some aspects, the ACK/NACK 606 may include a plurality of ACK/NACK bits (e.g., 606a, 606b, 606c, 606d, etc.), where each ACK/NACK bit is associated with a corresponding CBG. In some instances, the UE may ACK the TCI update indicated by the DCI 602 by including an ACK for at least one of the plurality of ACK/NACK bits (e.g., any of 606a, 606b, 606c, 606d, etc.) of the A/N 606. In this regard, including the ACK for at least one of the ACK/NACK bits may be based on (1) successfully receiving and decoding a CBG of a scheduled PDSCH communication or (2) a vPDSCH. However, in other instances, the UE may be considered to ACK the TCI update indicated by the DCI 602 if the UE includes an ACK for one or more particular CBG(s) or multiple CBGs (e.g., a certain number of CBGs and/or a threshold percentage of the total number of CBGs). The UE may switch to a new TCI state (e.g., TCI 608) after transmitting the ACK606.

Figure 10A:
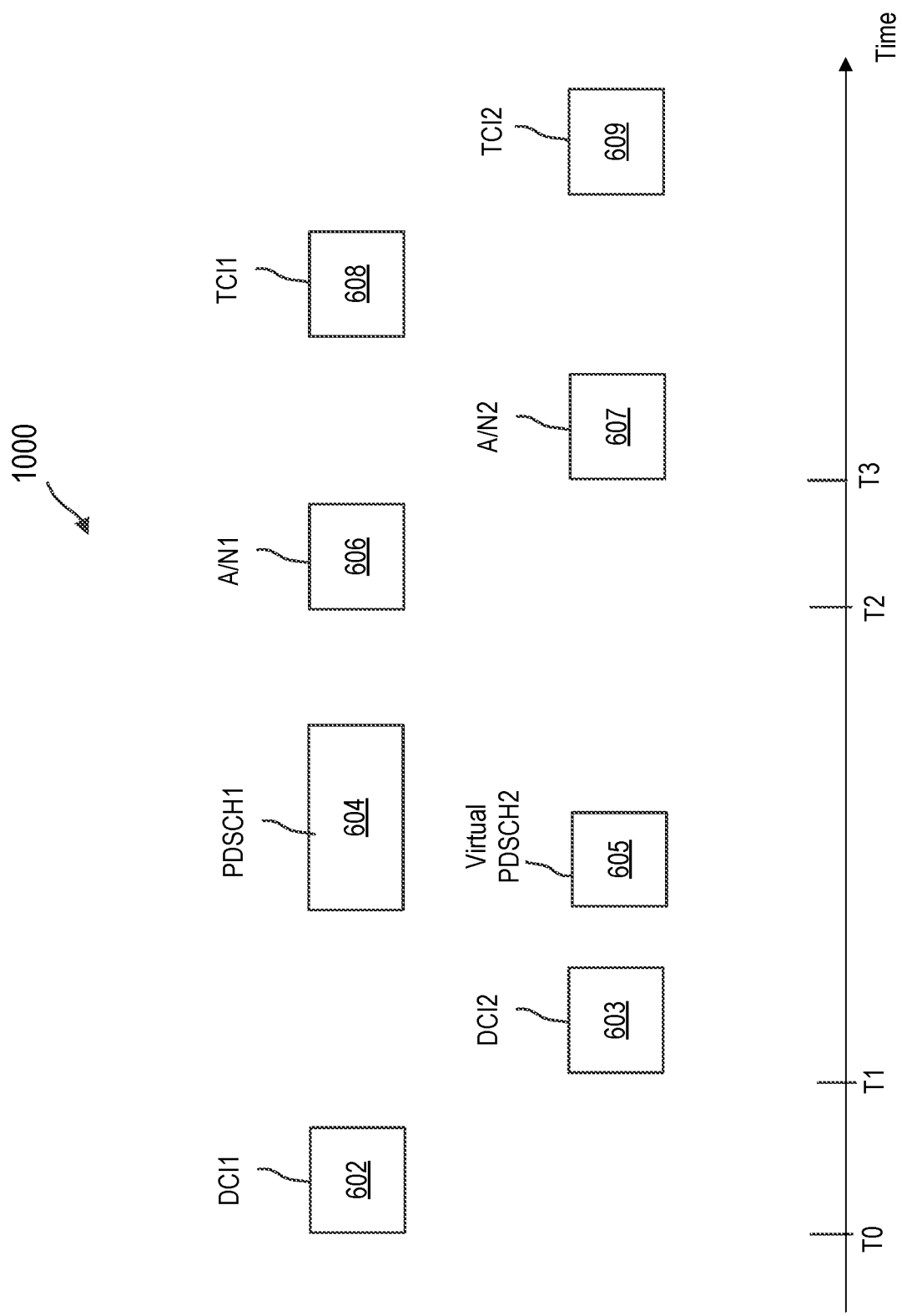
FIG. 10A illustrates a beam indication communication scheme according to one or more aspects of the present disclosure.

FIGS. 10A and 10B illustrate a scenario for implementing a TCI update of a DCI when a DCI with a TCI update is received later than another DCI also including a TCI update, according to some aspects of the present disclosure. The scenario 1000 is illustrated in FIG. 10A, while FIG. 10B illustrates a scenario 1001. The UE may receive the DCI 1 602 (e.g., at time T0) prior to the DCI 2 603 (e.g., at time T1). The DCI 1 602 may schedule a data communication (e.g., PDSCH 1 604) and include an indication of a TCI update (e.g., TCI1 608). The UE may transmit an ACK/NACK (e.g., A/N 606) associated with the data communication (e.g., PDSCH 1 604). The DCI 2 603 may include an indication of a TCI update (e.g., TCI 2 609), but not schedule a data communication. Instead, the DCI 2 603 may indicate a location of a virtual PDSCH (e.g., vPDSCH 2 605) that may be used to determine a corresponding location of an ACK/NACK (e.g., A/N 2 607). In this regard, the location of the virtual PDSCH (e.g., vPDSCH 2 605) may be selected by the network unit such that the ACK/NACK associated with the virtual PDSCH (e.g., A/N 2 607) occurs at a time (e.g., time T3) no earlier than a time (e.g., time T2) of the ACK/NACK associated with PDSCH (e.g., A/N 1 606). Accordingly, in some aspects, the timing and/or location of the PDSCH communication or virtual PDSCH of a later DCI is selected by the network unit to ensure that an ACK/NACK associated with the later DCI is received no earlier than the ACK/NACK associated with an earlier DCI. This can ensure that the TCI update indicated by the later DCI may be implemented instead of a TCI update indicated by the earlier DCI or implemented after the TCI update indicated by the earlier DCI. In this regard, in some aspects the UE does not expect to transmit an ACK/NACK associated with a later received DCI prior to transmitting an ACK/NACK associated with an earlier received DCI. Accordingly, as shown in FIG. 10B, in some instances a rule may prevent a network unit from scheduling a vPDSCH with a later DCI (e.g., DCI 2 603) that will result in an associated ACK/NACK (e.g., A/N 2 607) occurring before an ACK/NACK (e.g., A/N 606) for a PDSCH communication (e.g., PDSCH 1 604) of an earlier DCI (e.g., DCI 1 602). If the ACK/NACK associated with the later DCI is scheduled before the ACK/NACK associated with the earlier DCI, then the UE may determine an error has occurred.

Figure 11:
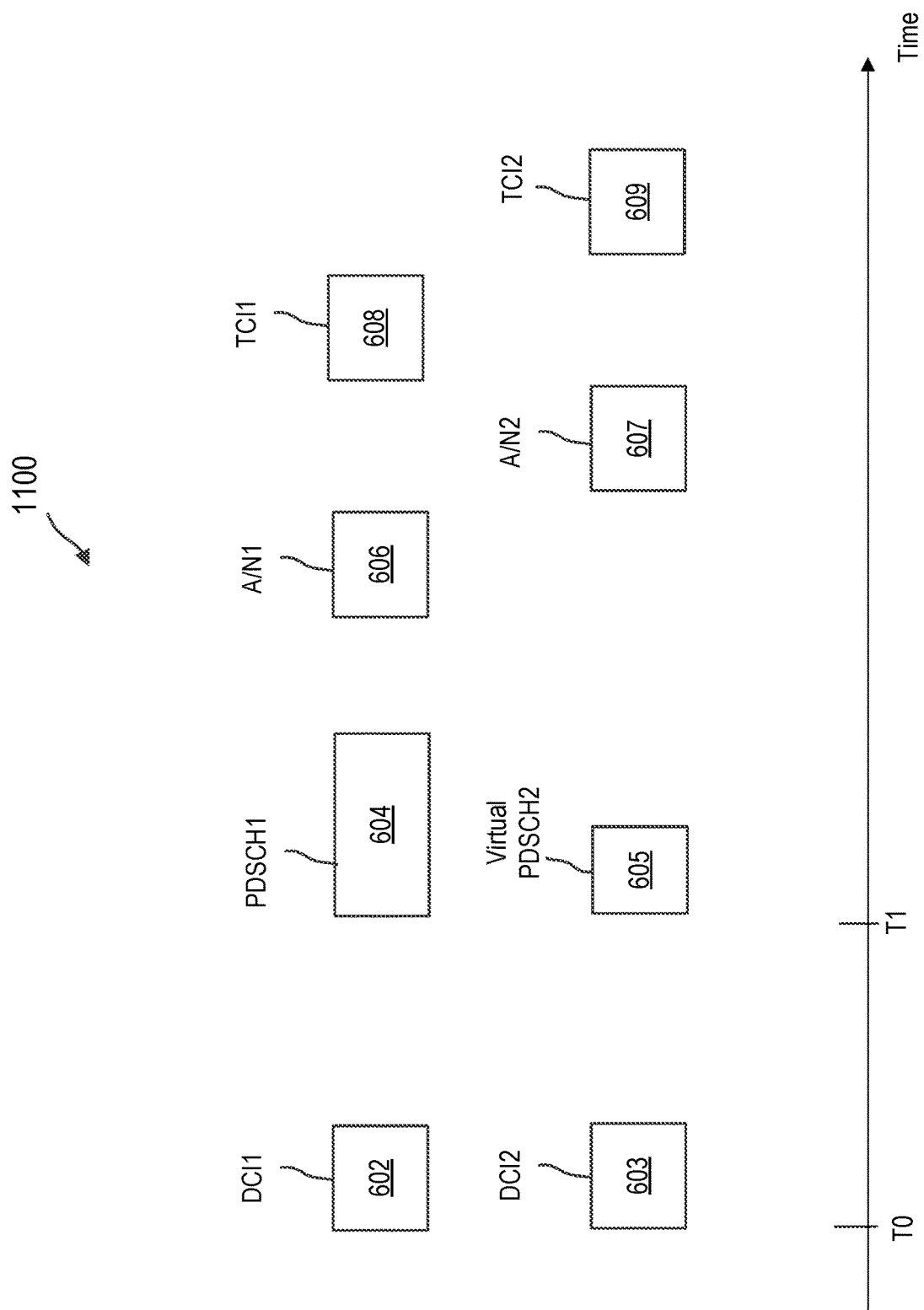
FIG. 11 illustrates a beam indication communication scheme according to one or more aspects of the present disclosure.

FIG. 11 illustrates a scenario 1100 for implementing a TCI update of a DCI when a plurality of DCIs are received, according to some aspects of the present disclosure. For example, the UE may receive the DCI 1 602 and the DCI 2 603 at the same time (e.g., T0) and/or in the same slot. The UE may transmit the A/N 1 606 associated with the DCI 1 602 and the A/N 2 607 associated with the DCI 2 603 in an order based on one or more factors. In this regard, the order of the A/N 1 606 and A/N 2 607 may be the order of bits within a single HARQ feedback (e.g., for type 1 HARQ feedback and/or type 2 HARQ feedback), the order of separate HARQ feedback communications (e.g., for type 1 HARQ feedback and/or type 2 HARQ feedback), and/or combinations thereof. In some instances, the order of the A/N 606 and A/N 607 may be based on one or more of the start time(s) of the associated PDSCH communication(s) (e.g., PDSCH 1 604 and/or vPDSCH 2 605) and/or relative priorities of the PDSCH communications (e.g., vPDSCH may have a higher priority than SPS PDSCH and SPS PDSCH may have a higher priority than a normal PDSCH, though other prioritizations may be used as well). In some instances, the order of DCIs as used in one or more DAI counter(s) (e.g., for type 2 HARQ feedback) may be based on one or more of the start time(s) of the associated PDSCH communication(s) (e.g., PDSCH 1 604 and/or vPDSCH 2 605) and/or relative priorities of the PDSCH communications (e.g., vPDSCH may have a higher priority than SPS PDSCH and SPS PDSCH may have a higher priority than a normal PDSCH, though other prioritizations may be used as well). For example, in some instances when two or more DCIs are received at the same time and/or within the same slot, the DCI having the earliest scheduled PDSCH communication will be the leading DCI in the DAI counter, followed by the DCI associated with the next scheduled PDSCH communication, etc. If two or more of the DCIs schedule a PDSCH communication at the same time, then the relative priorities of the scheduled PDSCH communications may be utilized to determine the order of the DCIs for the DAI counter. For example, a DCI scheduling a vPDSCH may positioned before a DCI scheduling SPS PDSCH and/or a normal PDSCH in the DAI counter in some instances.

Figure 12:
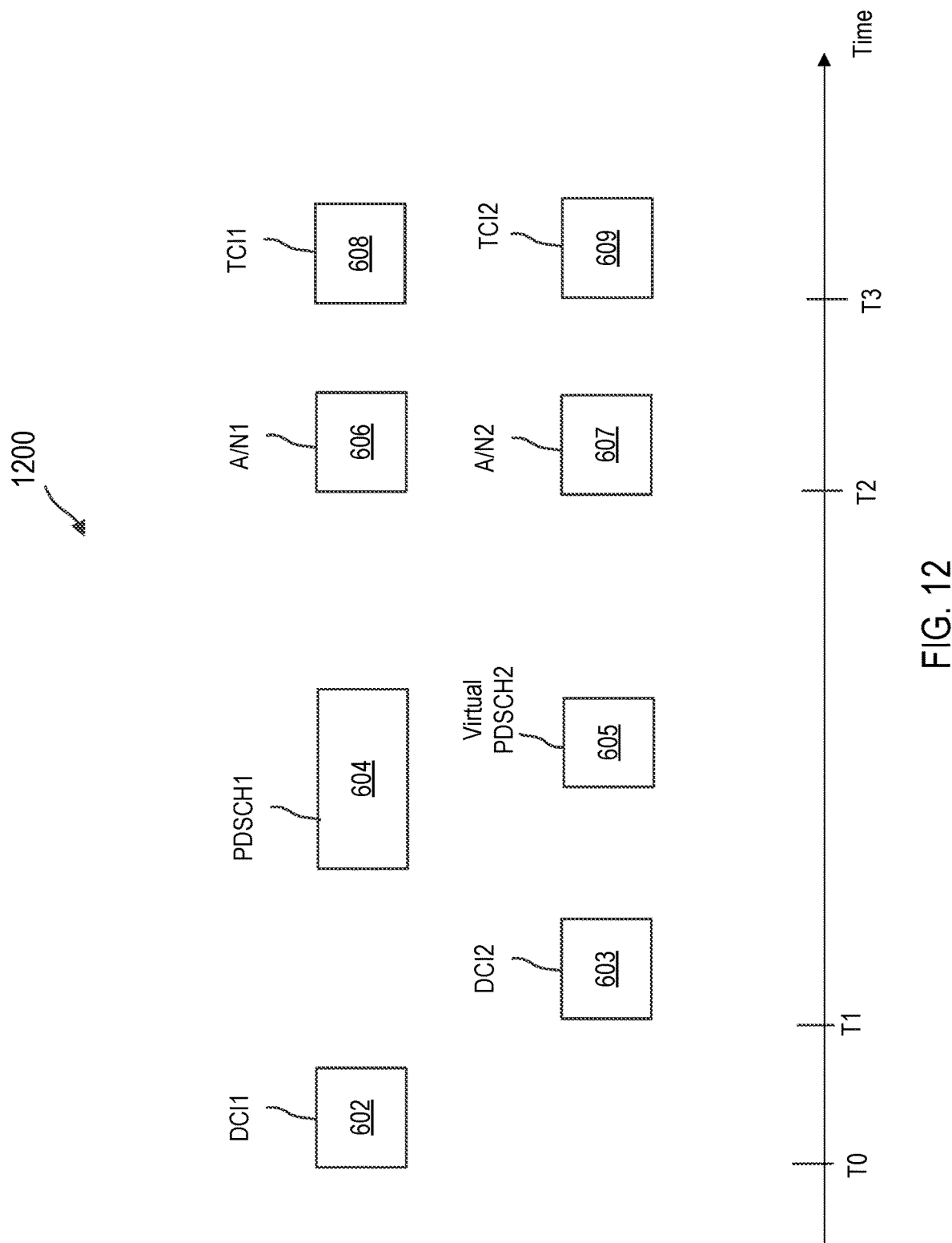
FIG. 12 illustrates a beam indication communication scheme according to one or more aspects of the present disclosure.

FIG. 12 illustrates a scenario 1200 for implementing a TCI update of a DCI according to some aspects of the present disclosure. In some instances, a UE may receive two (or more) DCIs both including TCI updates and scheduling PDSCH communications (e.g., PDSCH 1 604 and/or vPDSCH 2 605) that result in corresponding ACK/NACKs for the DCIs being scheduled for transmission at the same time (e.g., the same slot and/or same symbol) For example, as shown in FIG. 12, the UE may receive the DCI 1 602 and the DCI 2 603 at different times or slots (e.g., at T1 and T0, respectively). However, the location of the A/N 2 607 and the location of the A/N 1 606 may be determined to be in the same slot (e.g., based on the offset indicators in the DCI 2 603 and the DCI 1 602 and/or the scheduling of the vPDSCH 2 605 and PDSCH 1 604 by the DCI 2 603 and the DCI 1 602). In some aspects, the UE does not expect the locations of the A/N 2 607 and A/N 1 606 to overlap and, therefore, may regard the scenario as an error. In such situations, the UE may choose to implement neither TCI update and/or implement one of the TCI updates from either DCI 1 602 or DCI 2 603. In some other aspects, the UE may prioritize the TCI update of one of the DCIs (e.g., DCI 1 602 or DCI 2 603) over the TCI update associated with the other DCI (e.g., DCI 2 603 or DCI 1 602). In this regard, the UE may implement the prioritized TCI update at time T3. In some aspects, the UE may determine the relative priorities of the TCI updates based on one or more of: the reception times of the DCI 2 603 and the DCI 1 602, TCI values indicated by the TCI 2 609 and TCI 1 608, HARQ codebook positions of the A/N 2 607 or the A/N 1 606, and/or other factors.

Figure 13:
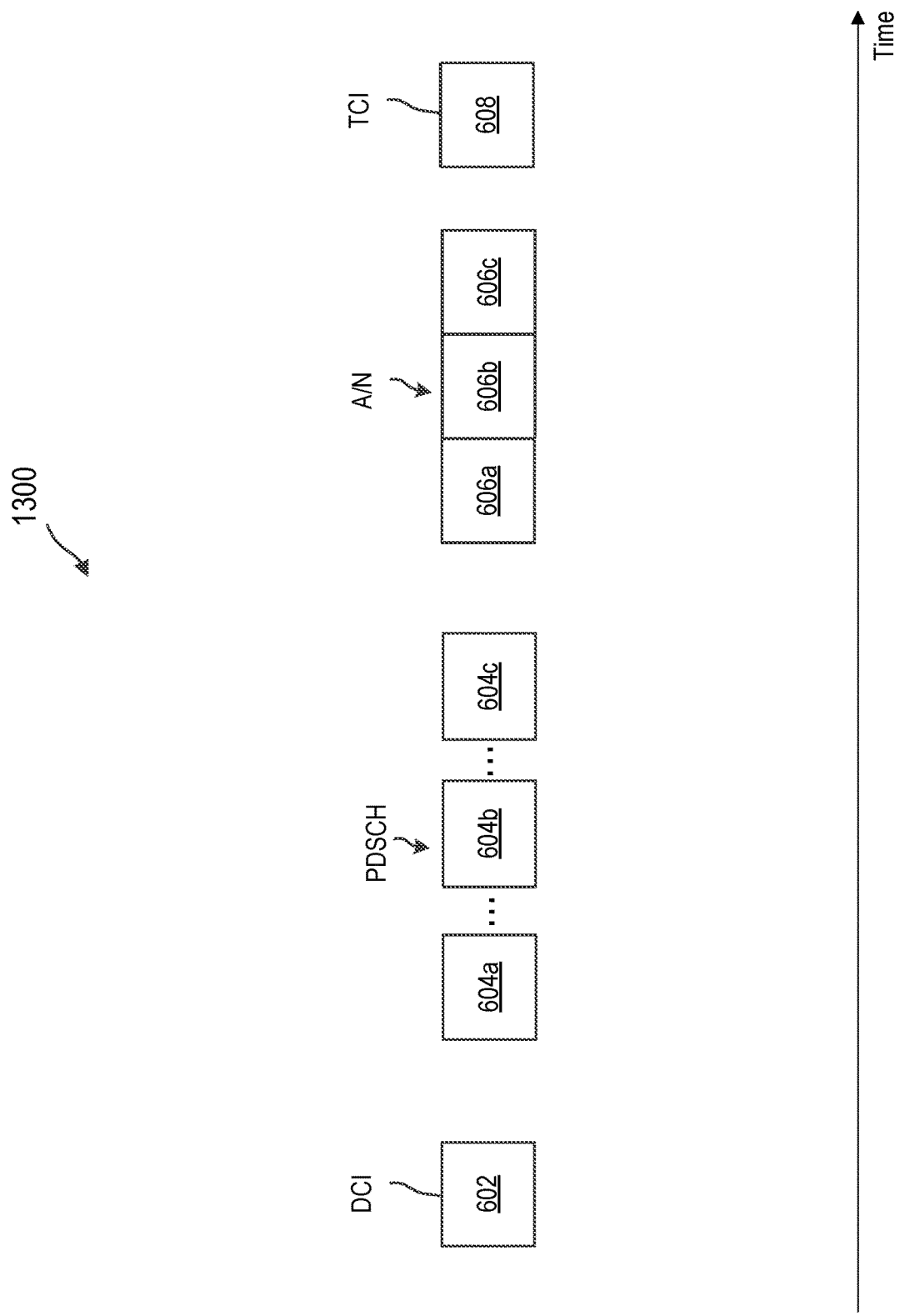
FIG. 13 illustrates a beam indication communication scheme according to one or more aspects of the present disclosure.

FIG. 13 illustrates a scenario 1300 for implementing a TCI update of a DCI when a single DCI schedules a plurality of PDSCH communications (e.g., multi-PDSCHs), according to some aspects of the present disclosure. The DCI 602 may be an example of one or both of the DCI 1 602 and DCI 2 603. As shown in FIG. 13, DCI 602 may schedule a plurality of PDSCH communications 604a, 604b, 604c, etc. In some aspects, one or more of the PDSCH communications 604a, 604b, 604c, etc. may be separated from one or more of the other PDSCH communications by a non-zero time interval. For example, the plurality of PDSCH communications may be separated by at least one symbol and/or at least one slot. In some instances, one or more of the PDSCH communications 640a, 604b, 604c, etc. may be in a in different slots from one or more of the other PDSCH communications. The UE may transmit a plurality of ACK/NACK bits (e.g., 606a, 606b, 606c, etc.) associated with the plurality of PDSCH communications 604a, 604b, 604c, etc. The plurality of ACK/NACK bits (e.g., 606a, 606b, 606c, etc.) may be included in a single HARQ feedback message in some instances. In some aspects, if the UE transmits an ACK for any of the plurality of PDSCH communications (e.g., 606a, 606b, 606c, etc.) scheduled by the DCI 602, the network unit receiving the ACK (e.g., 606a, 606b, 606c, etc.) may treat the received ACK as an ACK for the TCI update indicated by the DCI 602. For example, if the UE transmits an ACK 606a for the scheduled PDSCH communication 604a, then the network unit receiving the ACK 606a may treat the received ACK 606a as an ACK for the TCI update of the DCI 602 as well. Similarly, in some instances if the UE transmits an ACK for one or more data streams of multiple data streams scheduled by a DCI, an ACK for any one of the data streams may also serve as an ACK of the TCI update indicated by the DCI. For example, the plurality of PDSCH communications 604a, 604b, 604c, 604d, etc. may each represent a data stream and the ACK/NACK bits 606a, 606b, 606c, 606d, etc.) may be ACK/NACKs for the corresponding data streams, which may be included in a common or separate HARQ feedback messages.

In some aspects, the DCI 602 may have a format associated with scheduling a plurality of data transmissions (e.g., multi-PDSCHs), but the DCI 602 may not schedule a data transmission (e.g., PDSCH communication) and only schedule a vPDSCH. For example, the DCI 602, having a format for scheduling multi-PDSCHs, may be used to indicate a TCI update (e.g., TCI 608) without scheduling a PDSCH communication. The DCI 602 may indicate the derived location of a vPDSCH. In some instances, the DCI 602 may indicate the location of the vPDSCH using a TDRA field. In some aspects, the UE may transmit the ACK associated with the DCI 602 using a type-1 HARQ-ACK codebook. In some instances, the derived location of the vPDSCH as indicated by the DCI 602 may not overlap with a scheduled PDSCH communications (if any) (e.g., as discussed above with respect to FIGS. 8A-8B). In some instances, the TDRA field of the DCI 602 (or other field of the DCI 602 indicating a location of the vPDSCH) may reference a row of a TDRA table (or other table) having multiple values (e.g., multiple SLIVs). Accordingly, one or more rules may be utilized to select a particular value from among the multiple available values. For example, in some instances, the last value in a row (e.g., k0[−1]), the first value in a row (e.g., k0), and/or other location in the list of values (e.g., SLIVs in a TDRA table) may be used to select the value to use for the type 1 HARQ feedback. In some instances, the difference between the ACK/NACK offset and the selected value (e.g., {k1−k0[−1]}) must be included in the available slot timing values (k1) included in an RRC list of available k1 values in order for a particular value (e.g., a SLIV from the indicated row of the TDRA table) to be selected.

In some aspects, the UE may transmit the ACK associated with the DCI 602 using a type-2 HARQ-ACK codebook. In this regard, the A/N associated with the DCI 602 may be contained in a sub-codebook 1 of the type-2 HARQ-ACK codebook. In this regard, the sub-codebook 1 may be used for single SLIV DCIs. In some instances, the sub-codebook 1 may be used for any DCI that is not configured with CBG-based scheduling and is configured with a TDRA table containing rows with a single SLIV, any DCI that is not configured with CBG-based scheduling and is configured with a TDRA table containing at least one row with multiple SLIVs and schedules only a single PDSCH, HARQ-ACK bit corresponding to an SPS PDSCH release or SCell dormancy indication without PDSCH, or HARQ-ACK bit corresponding to a TCI update without PDSCH. The sub-codebook 2 of the type-2 HARQ-ACK codebook may be used for multi-SLIV DCIs. In some instances, the sub-codebook 2 of the type-2 HARQ-ACK codebook may be used for any DCI that is configured with a TDRA table containing at least one row having multiple SLIVs and schedules a row with multiple SLIVs. In some instances, the UE does not expect to be configured with both CBG operation and multi-PDSCH scheduling for the same PUCCH cell group with a Type 2 codebook. In this regard, the UE may treat such a combination as an error.

Figure 14:
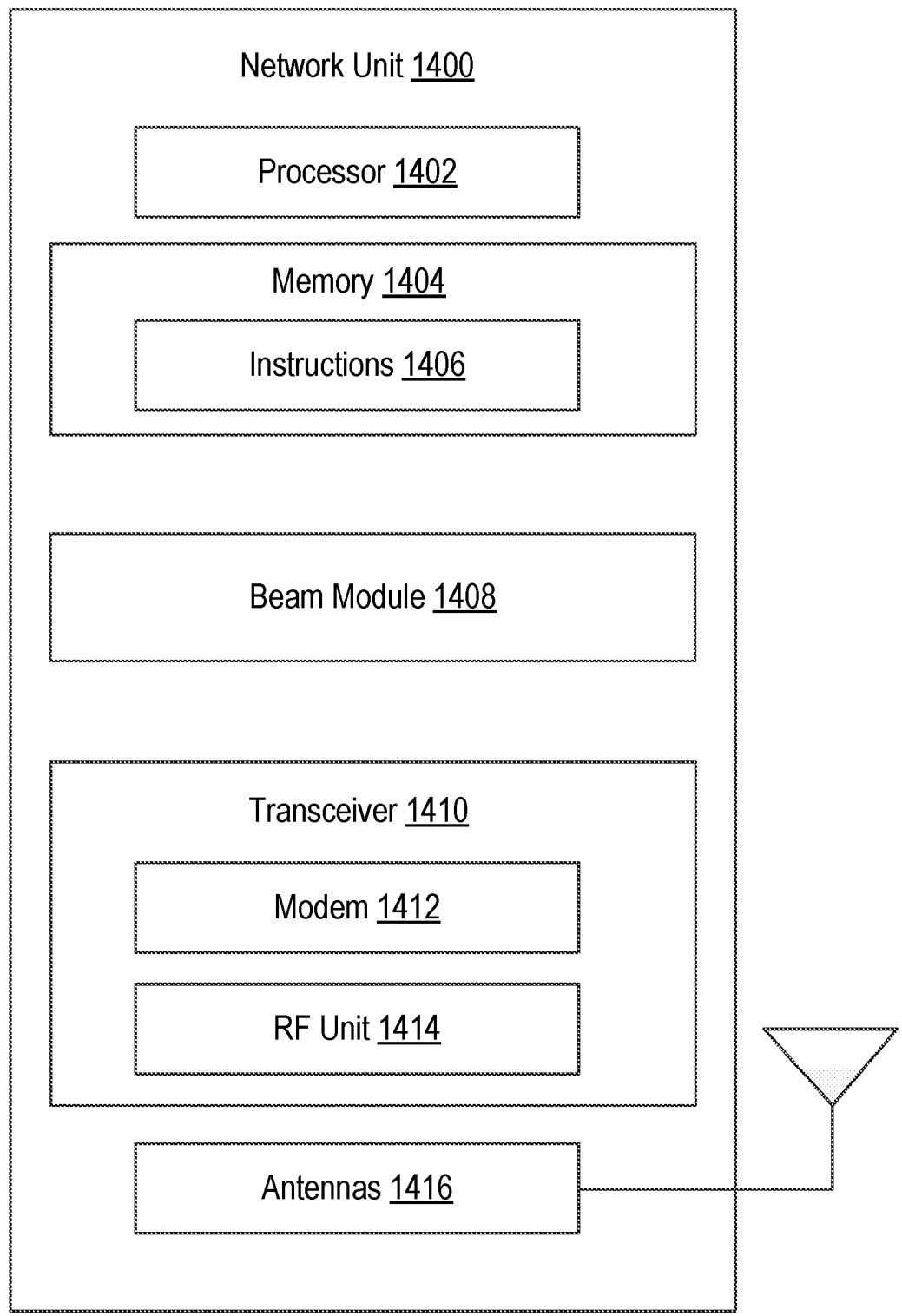
FIG. 14 is a block diagram of a network entity according to one or more aspects of the present disclosure.

FIG. 14 is a block diagram of a network entity 1400 according to one or more aspects of the present disclosure. The network entity 1400 may be a BS 105, DU 240, and/or CU 230 as discussed in FIGS. 1-13. Accordingly, the network entity 1400 may include a BS. The BS may be an aggregated BS or a disaggregated BS, as described above. As shown, the network entity 1400 may include a processor 1402, a memory 1404, a beam module 1408, a transceiver 1410 including a modem subsystem 1412 and a radio frequency (RF) unit 1414, and one or more antennas 1416. These elements may be coupled with one another. The term "coupled" may refer to directly or indirectly coupled or connected to one or more intervening elements. For instance, these elements may be in direct or indirect communication with each other, for instance via one or more buses.

The processor 1402 may have various features as a specific-type processor. For instance, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some aspects, the memory 1404 may include a non-transitory computer-readable medium. The memory 1404 may store instructions 1406. The instructions 1406 may include instructions that, when executed by the processor 1402, cause the processor 1402 to perform operations described herein, for instance, aspects of FIGS. 8A-8C, 9, 10A, 10B, and 11-13. Instructions 1406 may also be referred to as program code. The program code may be for causing a wireless communication device to perform these operations, for instance by causing one or more processors (such as processor 1402) to control or command the wireless communication device to do so. The terms "instructions" and "code" should be interpreted broadly to include any type of computer-readable statement(s). For instance, the terms "instructions" and "code" may refer to one or more programs, routines, sub-routines, functions, procedures, etc. "Instructions" and "code" may include a single computer-readable statement or many computer-readable statements.

The beam module 1408 may be implemented via hardware, software, or combinations thereof. For instance, the beam module 1408 may be implemented as a processor, circuit, and/or instructions 1406 stored in the memory 1404 and executed by the processor 1402. In some instances, the beam module 1408 can be integrated within the modem subsystem 1412. For instance, the beam module 1408 can be implemented by a combination of software components (e.g., executed by a DSP or a general processor) and hardware components (e.g., logic gates and circuitry) within the modem subsystem 1412. The beam module 1408 may communicate with one or more components of the network entity 1400 to implement various aspects of the present disclosure, for instance, aspects of FIGS. 8A-8C, 9, 10A, 10B, and 11-13.

In some aspects, the beam module 1408 may be configured, along with other components of the network unit 1400, to transmit first downlink control information (DCI) indicating a first transmission configuration indication (TCI) update, transmit second DCI, the second DCI indicating a second TCI update different than the first TCI update, receive a first acknowledgement (ACK) associated with the first DCI, receive a second ACK associated with the second DCI; and switch, based on a prioritizing of the first TCI update or the second TCI update, from a first TCI state to a second TCI state. The beam module 1408 may be configured to prioritize the first TCI update or the second TCI update based on at least one of: transmission times of the first DCI and the second DCI; TCI values of the first TCI update and the second TCI update; codebook positions of the first ACK and the second ACK; or reception times of the first ACK and the second ACK. The beam module 1408 may be configured to switch TCI states based on the prioritized TCI update.

As shown, the transceiver 1410 may include the modem subsystem 1412 and the RF unit 1414. The transceiver 1410 can be configured to communicate bi-directionally with other devices, such as the UE 115, UE 515, UE 615, UE 715, UE 900 and/or another core network element. The modem subsystem 1412 may be configured to modulate and/or encode data according to a modulation and coding scheme (MCS), e.g., a low-density parity check (LDPC) coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (DCI, TCI state, an indication of a beam direction associated with a beam application time, communication signals, data signals, etc.) from the modem subsystem 1412 (on outbound transmissions). The RF unit 1414 may be further configured to perform analog beamforming in conjunction with the digital beamforming. Although shown as integrated together in transceiver 1410, the modem subsystem 1412 and/or the RF unit 1414 may be separate devices that are coupled together at the network entity 1400 to enable the network entity 1400 to communicate with other devices.

The RF unit 1414 may provide the modulated and/or processed data, e.g., data packets (or, more generally, data messages that may contain one or more data packets and other information), to the antennas 1416 for transmission to one or more other devices. The antennas 1416 may further receive data messages transmitted from other devices and provide the received data messages for processing and/or demodulation at the transceiver 1410. The transceiver 1410 may provide the demodulated and decoded data (e.g., communication signals, data signals, etc.) to the beam module 1408 for processing. The antennas 1416 may include multiple antennas of similar or different designs in order to sustain multiple transmission links.

In some aspects, the transceiver 1410 is configured to transmit, to a UE, an indication of a first beam direction associated with a beam application time. The transceiver 1410 is further configured to receive an UL communication including one or more repetitions of a UL communication signal. The transceiver 1410 is configured to receive the UL communication by, for instance, receiving, based on a second beam direction different from the first beam direction before the beam application time, at least a first repetition of the one or more repetitions of the UL communication signal and receiving, based on the first beam direction and on the beam application time, at least a second repetition of the one or more repetitions of the UL communication signal.

In some aspects, the transceiver 1410 is configured to transmit, to a UE, an indication of a first beam direction associated with a beam application time. The transceiver 1410 is further configured to receive, based on a second beam direction different from the first beam direction, a first UL communication including one or more repetitions of a first UL communication signal, wherein at least a first repetition of the one or more repetitions is received before the beam application time and at least a second repetition of the one or more repetitions is received after the beam application time. The transceiver 1410 is further configured to receive, based on the first beam direction, a second UL communication after receiving the first UL communication.

In some aspects, the transceiver 1410 is configured to transmit, to a UE, an indication of a first beam direction associated with a beam application time. The transceiver 1410 is further configured to receive, based on a second beam direction different from the first beam direction before the beam application time, a first UL communication including one or more repetitions of a first UL communication signal less than a number of repetitions associated with a UL grant for the first UL communication. The transceiver 1410 is further configured to refrain from receiving at least a second repetition of the UL communication signal associated with the UL grant after the beam application time. The transceiver 1410 is further configured to receive, based on the first beam direction and the beam application time, a second UL communication.

Figure 15:
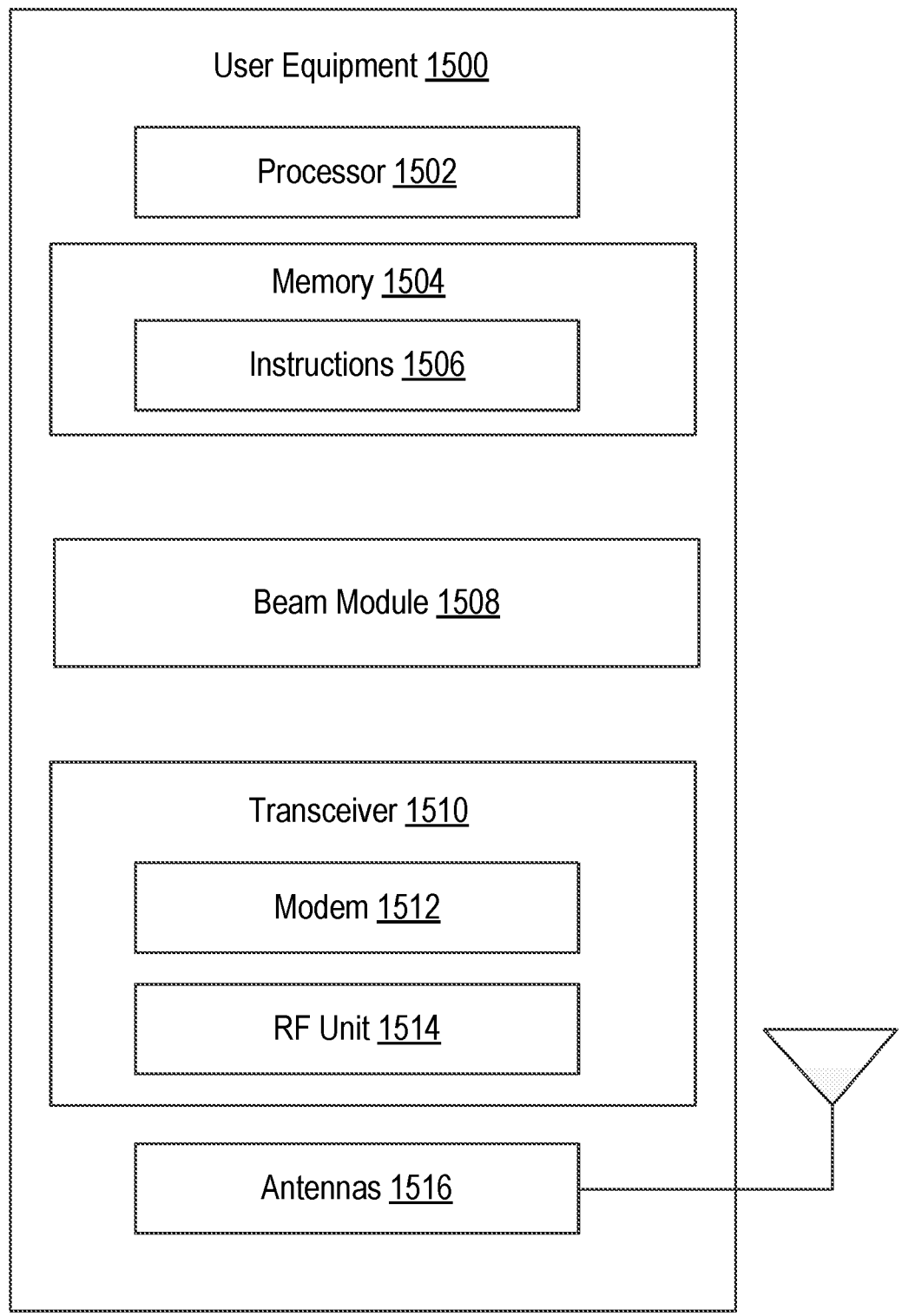
FIG. 15 is a block diagram of a user equipment (UE) according to one or more aspects of the present disclosure.

FIG. 15 is a block diagram of a UE 1500 according to one or more aspects of the present disclosure. The UE 1500 may be, for instance, a UE 115 as discussed in FIGS. 1-13. As shown, the UE 1500 may include a processor 1502, a memory 1504, a beam module 1508, a transceiver 1510 including a modem subsystem 1512 and an RF unit 1514, and one or more antennas 1516. These elements may be coupled with one another. The term "coupled" may refer to directly or indirectly coupled or connected to one or more intervening elements. For instance, these elements may be in direct or indirect communication with each other, for instance via one or more buses.

The processor 1502 may include a CPU, a DSP, an ASIC, a controller, a FPGA device, another hardware device, a firmware device, or any combination thereof configured to perform the operations described herein. The processor 1502 may also be implemented as a combination of computing devices, e.g., a combination of a DSP and a microprocessor, a plurality of microprocessors, one or more microprocessors in conjunction with a DSP core, or any other such configuration.

The memory 1504 may include a cache memory (e.g., a cache memory of the processor 1502), RAM, MRAM, ROM, PROM, EPROM, EEPROM, flash memory, solid state memory device, hard disk drives, other forms of volatile and non-volatile memory, or a combination of different types of memory. In an aspect, the memory 1504 includes a non-transitory computer-readable medium. The memory 1504 may store, or have recorded thereon, instructions 1506. The instructions 1506 may include instructions that, when executed by the processor 1502, cause the processor 1502 to perform the operations described herein with reference to a UE 115 or an anchor in connection with aspects of the present disclosure, for instance, aspects of FIGS. 8A-8C, 9, 10A, and 11-13. Instructions 1506 may also be referred to as code, which may be interpreted broadly to include any type of computer-readable statement(s) as discussed above with respect to FIGS. 8A-8C, 9, 10A, 10B, and 11-13.

The beam module 1508 may be implemented via hardware, software, or combinations thereof. For instance, the beam module 1508 may be implemented as a processor, circuit, and/or instructions 1506 stored in the memory 1504 and executed by the processor 1502. In some aspects, the beam module 1508 can be integrated within the modem subsystem 1512. For instance, the beam module 1508 can be implemented by a combination of software components (e.g., executed by a DSP or a general processor) and hardware components (e.g., logic gates and circuitry) within the modem subsystem 1512. The beam module 1508 may communicate with one or more components of the UE 1500 to implement various aspects of the present disclosure, for instance, aspects of FIGS. 8A-8C, 9, 10A, 10B, and 11-13.

In some aspects, the beam module 1508 may be configured, along with other components of the UE 1500, to receive first downlink control information (DCI) indicating a first transmission configuration indication (TCI) update, receive second DCI indicating a second TCI update different than the first TCI update, transmit a first acknowledgement (ACK) associated with the first DCI, transmit a second ACK associated with the second DCI; and switch, based on a prioritizing of the first TCI update or the second TCI update, from a first TCI state to a second TCI state. The beam module 1508 may be configured to prioritize the first TCI update or the second TCI update based on at least one of: reception times of the first DCI and the second DCI; TCI values of the first TCI update and the second TCI update; codebook positions of the first ACK and the second ACK; or transmission times of the first ACK and the second ACK. The beam module 1508 may be configured to switch TCI states based on the prioritized TCI update.

As shown, the transceiver 1510 may include the modem subsystem 1512 and the RF unit 1514. The transceiver 1510 can be configured to communicate bi-directionally with other devices, such as the BSs 105 and/or network entities 705. The modem subsystem 1512 may be configured to modulate and/or encode the data from the memory 1504 and/or the beam module 1508 according to a MCS, e.g., a LDPC coding scheme, a turbo coding scheme, a convolutional coding scheme, a digital beamforming scheme, etc. The RF unit 1514 may be configured to process (e.g., perform analog to digital conversion or digital to analog conversion, etc.) modulated/encoded data (e.g., communication signals, data signals, etc., etc.) from the modem subsystem 1512 (on outbound transmissions). The RF unit 1514 may be further configured to perform analog beamforming in conjunction with the digital beamforming. Although shown as integrated together in transceiver 1510, the modem subsystem 1512 and the RF unit 1514 may be separate devices that are coupled together at the UE 1500 to enable the UE 1500 to communicate with other devices.

The RF unit 1514 may provide the modulated and/or processed data, e.g., data packets (or, more generally, data messages that may contain one or more data packets and other information), to the antennas 1516 for transmission to one or more other devices. The antennas 1516 may further receive data messages transmitted from other devices. The antennas 1516 may provide the received data messages for processing and/or demodulation at the transceiver 1510. The transceiver 1510 may provide the demodulated and decoded data (e.g., DCI, TCI, TCI configuration, a TCI activation, an indication of a beam direction associated with a beam application time, communication signals, data signals, etc.) to the beam module 1508 for processing. The antennas 1516 may include multiple antennas of similar or different designs in order to sustain multiple transmission links.

In some aspects, the transceiver 1510 may be configured to receive, from a BS, an indication of a first beam direction associated with a beam application time. The transceiver 1510 may be further configured to communicate a first communication including one or more repetitions of a communication signal. The transceiver 1510 may be configured to communicate the first communication by communicating, based on a second beam direction different from the first beam direction before the beam application time, at least a first repetition of the one or more repetitions of the communication signal and communicating, based on the first beam direction and the beam application time, at least a second repetition of the one or more repetitions of the communication signal.

In some aspects, the transceiver 1510 may be configured to receive, from a BS, an indication of a first beam direction associated with a beam application time. The transceiver 1510 may be further configured to communicate, based on a second beam direction different from the first beam direction, a first communication including one or more repetitions of a first communication signal, where at least a first repetition of the one or more repetitions is communicated before the beam application time and at least a second repetition of the one or more repetitions is communicated after the beam application time. The transceiver 1510 may be further configured to communicate, based on the first beam direction, a second communication after communicating the first communication.

In some aspects, the transceiver 1510 may be configured to receive, from a BS, an indication of a first beam direction associated with a beam application time. The transceiver 1510 may be further configured to communicate, based on a second beam direction different from the first beam direction before the beam application time, a first communication including one or more repetitions of a first communication signal less than a number of repetitions associated with a grant for the first communication. The transceiver 1510 may be further configured to refrain from communicating at least a second repetition of the one or more repetitions of the first communication signal. The transceiver 1510 may be further configured to communicate, based on the first beam direction and on the beam application time, a second communication after communicating the first communication.

Figure 16:
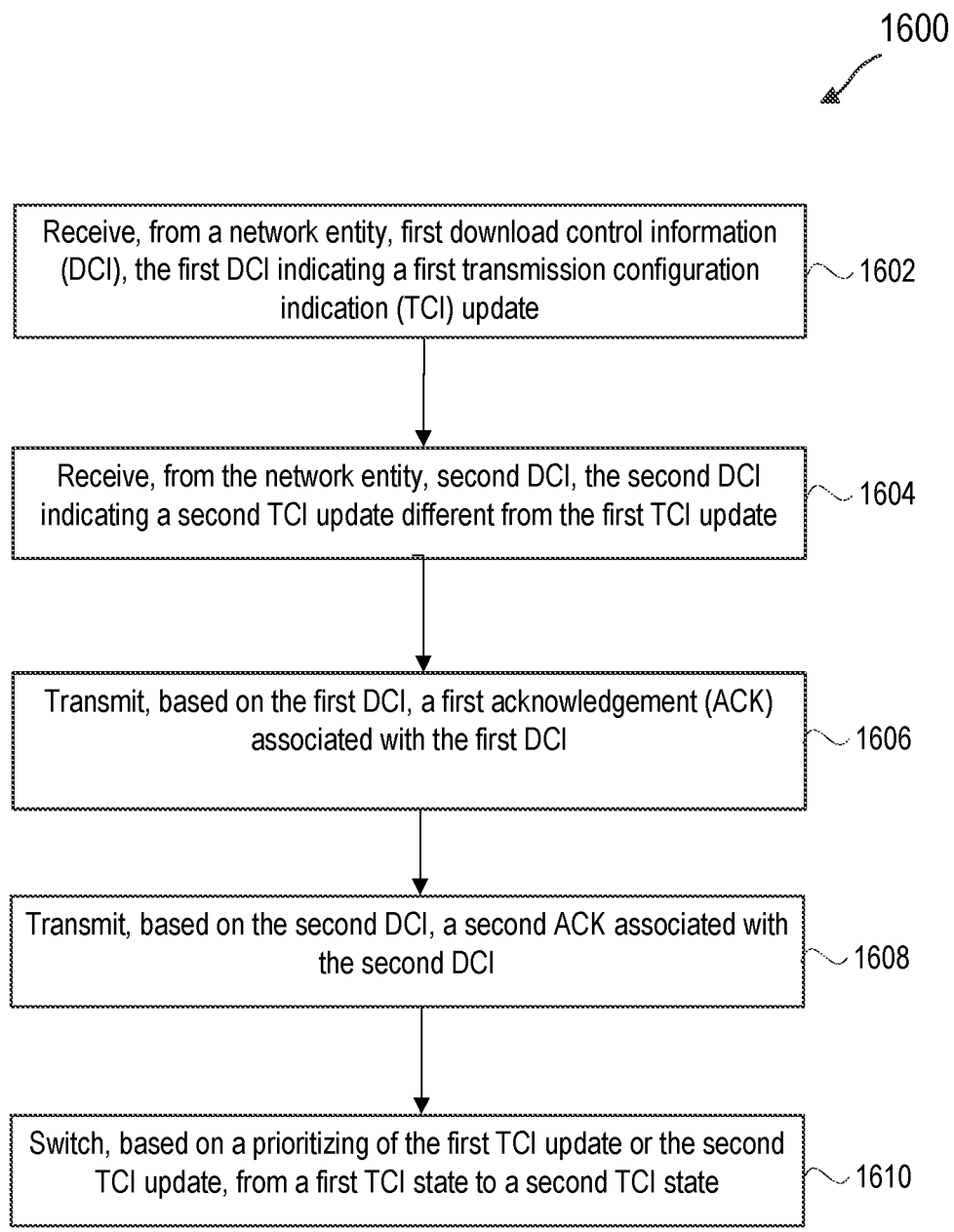
FIG. 16 is a flow diagram illustrating a beam indication communication method according to one or more aspects of the present disclosure.

FIG. 16 is a flow diagram illustrating a wireless communication method 1600 according to one or more aspects of the present disclosure. Aspects of the method 1600 can be executed by a computing device (e.g., a processor, processing circuit, and/or other suitable component) of a wireless communication device or other suitable means for performing the blocks. For instance, the wireless communication device may be a UE (e.g., UE 115 or UE 1500). The UE may utilize one or more components, such as the processor 1502, the memory 1504, the beam module 1508, the transceiver 1510, the modem 1512, the RF unit 1514, and/or the one or more antennas 1516, to execute the blocks of method 1600. The method 1600 may employ similar mechanisms as described in FIGS. 6A-6C, 7A, 7B, 8A-8C, 9, 10A, 10B, and 11-13. As illustrated, the method 1600 includes a number of enumerated blocks, but aspects of the method 1600 may include additional blocks before, after, and in between the enumerated blocks. In some aspects, one or more of the enumerated blocks may be omitted or performed in a different order.

At block 1602, the UE (e.g., UE 115 or UE 1500) receives first download control information (DCI). The UE may receive the first DCI from a network unit (e.g., BS 105, RU 240, DU 230, CU 210, and/or network unit 1400). The UE may receive the first DCI via a physical downlink control channel (PDCCH) or other suitable communications channel. The first DCI may be in any suitable DCI message format, including without limitation DCI 1_1 and DCI 1_2.

The first DCI may indicate a first transmission configuration indication (TCI) update. The first TCI update may indicate to activate a new TCI state. For example, the first TCI update may indicate to a switch from a current TCI state to a different TCI state. The first TCI update may provide updated information about one or more beams and/or channels/reference signals (RSs) associated with the one or more beams. For example, the new TCI state can include information about different channels/RSs a beam can be used for other than the current channels/RSs. In some aspects, prior to receiving the first TCI update, the UE may receive a configuration for one or more TCIs. In some aspects, receiving the configuration for the one or more TCIs may include receiving an RRC configuration including one or more sets of TCIs. The RRC configuration may indicate, for each TCI state, the corresponding communication signals and/or reference signals, and/or the corresponding QCL states. The UE may utilize one or more components, such as the processor 1502, the memory 1504, the beam module 1508, the transceiver 1510, the modem 1512, the RF unit 1514, and/or the one or more antennas 1516, to execute the actions of block 1602.

In some aspects, the first DCI may schedule one or more data transmissions in addition to indicating the first TCI update. For example, the first DCI may schedule a single transport block (TB) in one slot (e.g., FIG. 8A), multiple TBs (multi-TBs) in one slot (e.g., FIG. 8C), a single PDSCH communication (e.g., FIGS. 8A, 9, 10A, 11, 12), multiple PDSCH communications in one or multiple slots (e.g., FIG. 13), etc. Each TB may include one or more codeblock groups (CBGs). Each CBG may include one or more codeblocks. Each PDSCH communication may include a single TB or multiple TBs. The UE may transmit an ACK/NACK for the data transmission(s) scheduled by the first DCI. The UE may transmit the ACK/NACK in a physical uplink shared channel (PUSCH) and/or the physical uplink control channel (PUCCH). The UE may utilize a Type-1 HARQ-ACK codebook and/or a Type-2 HARQ-ACK codebook for transmitting the ACK/NACK. In some aspects, the UE may transmit one bit as a hybrid automatic repeat request (HARQ) feedback (e.g., 1 for ACK or 0 for NACK) of a PDSCH communication, a TB, and/or a CBG. In some aspects, the UE may transmit one ACK/NACK bit for each CBG in a TB as the HARQ feedback for the CBGs of a TB. In some aspects, the UE may transmit one ACK/NACK bit for each PDSCH communication of a plurality of scheduled PDSCH communications as the HARQ feedback for the plurality of PDSCH communications. In some instances, the ACK/NACK associated with the data transmission(s) scheduled by the first DCI may serve as an ACK/NACK for the first TCI update indicated by the first DCI. In some aspects, if the UE transmits an ACK for any PDSCH communication scheduled by the first DCI, the network unit receiving the ACK for the PDSCH communication may treat the received ACK as an ACK for the first TCI update indicated by the first DCI. For example, if the UE transmits an ACK for a scheduled TB and/or PDSCH communication, then the network unit receiving the ACK for the scheduled TB and/or PDSCH communication may treat the received ACK as an ACK for the first TCI update as well. Further, in some instances if the UE transmits an ACK for one or more CBGs of multiple CBGs of a TB, one or more PDSCH communications of multiple scheduled PDSCH communications, one or more data streams of multiple scheduled data streams, or otherwise transmits an ACK for one or more data transmissions scheduled by the first DCI, the ACK may also serve as the ACK of the first TCI update indicated by the first DCI.

In some aspects, the first DCI may not schedule any data transmissions along with indicating the first TCI update. For example, the first DCI may be provided to indicate the first TCI update without scheduling any data transmissions. In this regard, the content of one or more fields of the first DCI may indicate that the first DCI is providing the first TCI update without scheduling any data transmissions. For example, the cyclic redundancy check (CRC) of the first DCI can be scrambled by a configured scheduling (CS)—radio network temporary identifier (RNTI), and certain fields in the first DCI can be set to certain values (e.g., redundancy version (RV)=1, (modulation and coding scheme) MCS=1, new data indicator (NDI)=0, (frequency domain resource assignment) FDRA=0 (for FDRA type 0 and dynamicSwitch, or 1 for FDRA type 1)) to indicate that the first DCI is not scheduling a data transmission and./or the first DCI is providing the first TCI update. In other instances, the first DCI may use other parameters and/or values to indicate that no data transmission is scheduled and/or that a TCI update is being provided. The TCI field in the first DCI may indicate a TCI state identification (ID) associated with the first TCI update.

In some aspects, when the first DCI does not schedule a data communication, the UE may utilize the Type-1 HARQ-ACK codebook and/or the Type-2 HARQ-ACK codebook in a similar manner as to when the first DCI schedules one or more data communications. For example, if a UE provides HARQ-ACK information corresponding to detection of a DCI format that provides a TCI state update without scheduling a PDSCH communication reception, a location in the Type-1 HARQ-ACK codebook for the HARQ-ACK information may be the same as when the DCI format schedules a PDSCH reception with CBGs or with transport blocks that are correctly decoded. In this manner, when a DCI does not schedule a data communication, a virtual PDSCH (vPDSCH) may be utilized to determine the resources utilized for the ACK/NACK associated with the DCI. That is, a vPDSCH, which is not a scheduled DL communication, may be used to determine a location of an ACK associated with a DCI that does not schedule a data communication (see, e.g., DCI 2 in FIGS. 8A, 8C, 10A, 11, and 12).

In some aspects, the first DCI may include an indication of a location of the vPDSCH. In some aspects, the time domain resource assignment (TDRA) field of the first DCI may be used to indicate a location of the vPDSCH. In some aspects, the UE may receive the first DCI in a first slot and transmit an ACK associated with the first DCI in a second slot different from the first slot. The second slot may be offset from the first slot based on an offset indicator (e.g., k1). The offset indicator (k1) may be included in or indicated by the first DCI or otherwise be known by the UE and/or network unit. In some aspects, the location of the vPDSCH may be based on the location of the ACK associated with the first DCI. In this regard, if the UE receives the first DCI in the first slot and transmits the ACK associated with the first DCI in a second slot based on an offset indicator (e.g., k1), then the vPDSCH may be scheduled between the first slot and the second based on another offset indicator (e.g., k0) relative to the first slot. In some instances, the offset indicator associated with the vPDSCH may be equal to 0 such that the vPDSCH is scheduled in the slot immediately following the slot in which the first DCI is transmitted. In other instances, the slot associated with the vPDSCH is offset from the first slot in which the first DCI is received by one or more other slots. In some instances, the difference between the offset (e.g., k1) associated with the ACK and the offset associated with the vPDSCH (e.g., k0) may be among the set of available offset slot timing values (e.g., k1) associated with the ACK. The set of available slot timing values (e.g., k1) may be provided to the UE in an RRC list or other suitable communication. In some instances, the TDRA field may indicate a value of an offset (e.g., k0) that represents the offset between the first DCI to the vPDSCH. The PDSCH-to-HARQ feedback timing indicator in the first DCI may indicate a value of a time offset (e.g., k1) from the first DCI to the first ACK in the PUCCH. In some instances, the difference between k1 and k0, e.g., (k1–k0) may be a proper value of an offset between a scheduled PDSCH and an associated ACK.

At block 1604, the UE (e.g., UE 115 or UE 1500) receives second DCI. The UE may receive the second DCI from a network unit (e.g., BS 105, RU 240, DU 230, CU 210, and/or network unit 1400). In some aspects, the second DCI and the first DCI are transmitted by the same network unit. The UE may receive the second DCI before, simultaneously with, or after the first DCI. The UE may receive the second DCI via a physical downlink control channel (PDCCH) or other suitable communications channel. The second DCI may be in any suitable DCI message format, including without limitation DCI 1_1 and DCI 1_2.

The second DCI may indicate a second TCI update different from the first TCI update. In some aspects, the second TCI update may include transmission to activate another new TCI state that is different from the new TCI state of block 1602. For example, the second TCI update may include transmission to switch from a current TCI state to the other new TCI state. The second TCI update may provide updated information about one or more beams and/or channels/reference signals (RSs) associated with the one or more beams. For example, the other new TCI state can include information about different channels/RSs a beam can be used for other than the current channels/RSs or channels/RSs indicated in the second TCI update. The UE may utilize one or more components, such as the processor 1502, the memory 1504, the beam module 1508, the transceiver 1510, the modem 1512, the RF unit 1514, and/or the one or more antennas 1516, to execute the actions of block 1604.

In some aspects, the second DCI may schedule one or more data transmissions in addition to indicating the second TCI update. For example, similar to the scenario with the first DCI, the second DCI may schedule a single TB in one slot, multi-TBs in one slot, a single PDSCH communication, multiple PDSCH communications in one or multiple slots, etc. Each TB may include one or more CBGs. Each CBG may include one or more codeblocks. Each PDSCH communication may include a single TB or multiple TB s. The UE may transmit an ACK/NACK for the data transmission(s) scheduled by the second DCI. The UE may transmit the ACK/NACK in a PUSCH and/or the PUCCH. The UE may utilize a Type-1 HARQ-ACK codebook and/or a Type-2 HARQ-ACK codebook for transmitting the ACK/NACK. In some aspects, the UE may transmit one bit as a HARQ feedback of a PDSCH communication, a TB, and/or a CBG. In some aspects, similar to the scenario with the first DCI, the UE may transmit one ACK/NACK bit for each CBG in a TB or each PDSCH communication of a plurality of scheduled PDSCH communications as the HARQ feedback. Similar to the scenario with the first DCI, the ACK/NACK associated with the data transmission(s) scheduled by the second DCI may serve as an ACK/NACK for the second TCI update indicated by the second DCI. In some aspects, similar to the scenario with the first DCI, the network unit receiving the ACK for the PDSCH communication may treat the received ACK as an ACK for the second TCI update indicated by the second DCI. Further, similar to the scenario with the first DCI, the ACK for one or more CBGs of multiple CBGs of a TB, one or more PDSCH communications of multiple scheduled PDSCH communications, one or more data streams of multiple scheduled data streams, or otherwise for one or more data transmissions scheduled by the second DCI, may also serve as the ACK of the second TCI update indicated by the second DCI.

In some aspects, the second DCI may not schedule any data transmissions along with indicating the second TCI update. For example, similar to the scenario with the first DCI, the second DCI may be provided to indicate the second TCI update without scheduling any data transmissions. In this regard, the content of one or more fields of the second DCI may indicate that the second DCI is providing the second TCI update without scheduling any data transmissions. The detailed description of examples of the fields can be referred to that for the first DCI and is not repeated herein. In other instances, the second DCI may use other parameters and/or values to indicate that no data transmission is scheduled and/or that a TCI update is being provided.

In some aspects, when the second DCI does not schedule a data communication, the UE may utilize the Type-1 HARQ-ACK codebook and/or the Type-2 HARQ-ACK codebook in a similar manner as to when the second DCI schedules one or more data communications. In this manner, a vPDSCH may be utilized to determine the resources utilized for the ACK/NACK associated with the second DCI. The detailed descriptions of the Type-1 HARQ-ACK codebook and/or the Type-2 HARQ-ACK codebook employed for the transmission of ACK of the second DCI, the employment of a vPDSCH, and the settings in the second DCI (e.g., k0 and k1) for the vPDSCH can be referred to those for the first DCI and is not repeated herein.

Although not shown in the figures, in some aspects, the first DCI may or may not schedule data transmission(s), and the second DCI may or may not schedule data transmission(s). In other words, the first DCI and the second DCI may both schedule data transmission(s) or no data transmission(s). In some aspects, one of the first DCI and the second DCI may schedule data transmission(s), and the other one may not schedule data transmission(s). For illustrative purposes, the present disclosure shows the scenarios in which one (e.g., DCI 2/the first DCI, in FIGS. 8A, 8C, 10A, 11, 12) of the first DCI and the second DCI does not schedule data transmission(s), and the other one (e.g., DCI 1/the second DCI, in FIGS. 8A, 8C, 10A, 11, 12) schedules data transmission(s). The figures are not meant to limit the scope of the present disclosure.

At block 1606, the UE transmits, based on the first DCI, a first acknowledgement (ACK) associated with the first DCI. The UE may transmit the first ACK to the network unit (e.g., BS 105, RU 240, DU 230, CU 210, and/or network unit 1400) the UE received the first DCI from. In some aspects, the UE may transmit the first ACK via a PUSCH and/or PUCCH. In some aspects, the UE receives the first DCI in a first slot and transmits the ACK associated with the first DCI in a second slot different from the first slot. The second slot may be offset from the first slot based on an offset indicator (e.g., k1) in the first DCI. In some aspects, the UE may determine the timing to transmit the first ACK based on the scheduling associated with the first DCI and/or the second DCI. For example, in some instances the UE may determine the timing for transmitting the first ACK based on one or more data transmissions scheduled by the first DCI (e.g., PDSCH 1 in FIGS. 8A, 8C, 10A, 11, 12). In some instances, the UE may determine the timing for transmitting the first ACK based on one or more vPDSCHs associated with the first DCI (e.g., Virtual PDSCH 2 in FIGS. 8A, 8C, 10A, 11, 12). The UE may utilize one or more components, such as the processor 1502, the memory 1504, the beam module 1508, the transceiver 1510, the modem 1512, the RF unit 1514, and/or the one or more antennas 1516, to execute the actions of block 1606.

At block 1608, the UE transmits, based on the second DCI, a second ACK associated with the second DCI. The UE may transmit the second ACK to the network unit (e.g., BS 105, RU 240, DU 230, CU 210, and/or network unit 1400) the UE received the second DCI from. In some aspects, the UE may transmit the second ACK via a PUSCH and/or PUCCH. In some aspects, the UE receives the second DCI in a first slot and transmits the ACK associated with the second DCI in a second slot different from the first slot. The second slot may be offset from the first slot based on an offset indicator (e.g., k1) in the second DCI. In some aspects, the UE may determine the timing to transmit the second ACK based on the scheduling associated with the first DCI and/or the second DCI. For example, in some instances the UE may determine the timing for transmitting the second ACK based on one or more data transmissions scheduled by the first DCI (e.g., PDSCH 1 in FIGS. 8A, 8C, 10A, 11, 12). In some instances, the UE may determine the timing for transmitting the second ACK based on one or more vPD-SCHs associated with the first DCI (e.g., Virtual PDSCH 2 in FIGS. 8A, 8C, 10A, 11, 12). The UE may utilize one or more components, such as the processor 1502, the memory 1504, the beam module 1508, the transceiver 1510, the modem 1512, the RF unit 1514, and/or the one or more antennas 1516, to execute the actions of block 1606.

In some instances, the UE may determine the timing for transmitting the first ACK and/or the second ACK based on one or more factors. In this regard, the factors may take into account one or more of PDSCH scheduling, vPDSCH scheduling, DCI transmission/reception times, locations of the first ACK and the second ACK in a HARQ codebook, TCI values indicated by the first TCI update and the second TCI update, out-of-order rules, and/or other factors. For example, the UE may receive the second DCI (e.g., DCI 1) prior to the first DCI (e.g., DCI 2), and may transmit the first ACK no earlier than the second ACK. In some aspects, the UE may employ the rule illustrated in FIGS. 10A and 10B to determine the order that the first ACK and the second ACK is transmitted to the BS. For example, the UE may receive the second DCI prior to the first DCI, and may transmit the first ACK later than the second ACK. In some aspects, the first DCI (e.g., DCI 2) indicates a first TCI update and a vPDSCH, without scheduling a PDSCH. The UE may receive the vPDSCH earlier than, at the same time as, or later than the PDSCH. The UE may transmit the first ACK (based on the derived location of the vPDSCH) and the second ACK based on the determined order, and switch to new TCI states indicated by the first DCI based on the time the later one of the first ACK and the second ACK is transmitted.

At block 1610, the UE switches, based on a prioritizing of the first TCI update or the second TCI update, from a first TCI state to a second TCI state. The UE may prioritize the first TCI update or the second TCI update based on the scenarios/rules discussed above in the context of FIGS. 6A-6C, 7A, 7B, 8A-8C, 9, 10A, 10B, and 11-13. For example, the UE may prioritize the first TCI update or the second TCI update based on the order of the first ACK and the second ACK. In some aspects, the UE may determine an order of the first ACK and the second ACK based on the scenarios/rules discussed above in FIGS. 6A-6C, 7A, 7B, 8A-8C, 9, 10A, 10B, and 11-13, such that the PUSCH and/or PUCCH includes an earlier ACK (corresponding to one of the first ACK and the second ACK) and a later ACK (corresponding to the other one of the first ACK and the second ACK). The UE may then switch from the current TCI state to the new TCI state corresponding to the later ACK in the PUSCH and/or PUCCH. In some aspects, the UE may switch from the current TCI state to the new TCI state after transmitting the later ACK. In some aspects, the switching from the first TCI state to the second TCI state includes switching from the first TCI state to the second TCI state for a plurality of component carriers. In some aspects, the switching from the first TCI state to the second TCI state includes switching from the first TCI state to the second TCI state for all configured bandwidth parts in one or more component carriers. The time duration between the transmitting the later ACK and the switching to the new TCI state may be equal to a first beam application time (BAT). The BAT can be a predetermined time period. In some instances, the BAT may be based, at least in part, on a beam switching time of the UE. In some aspects, the BAT may be predetermined based on a smallest subcarrier spacing of the plurality of component carriers. In some aspects, a timing for the switching from the first TCI state to the second TCI state is based on the BAT associated with at least one active bandwidth part (BWP) of the plurality of component carriers. The UE may utilize one or more components, such as the processor 1502, the memory 1504, the beam module 1508, the transceiver 1510, the modem 1512, the RF unit 1514, and/or the one or more antennas 1516, to execute the actions of block 1610.

In some instances, the DCI(s) received by the UE (e.g., DCI 1 and/or DCI 2) may indicate an update to the active BWP(s) in addition to indicating a TCI update. In this regard, a DCI that indicates a TCI update may also indicate an active BWP update. In some instances, a first DCI (e.g., DCI 1) indicates a TCI update and a second DCI (e.g., DCI 2) indicates an active BWP update. A BWP field in the DCI may indicate the new active BWP(s). The new active BWP(s) may take effect after a BWP switching time. The switch to the new active BWP(s) may occur before, after, or at the same time as the switch to the new TCI state depending on the relative timing of the BWP switching time to the BAT associated with the TCI update. In some instances, different BWPs may be associated with different pools or lists of TCI states. Accordingly, in such instances the same TCI index included in a DCI may refer to different TCI states depending on the active BWP(s). In accordance with the present disclosure, one or more rules may be implemented to determine which active BWP(s) should be used to determine the TCI state associated with a TCI update and/or determine the timing of implementing the BWP switch and/or the TCI state switch.

In some instances, the UE (and the network unit) may utilize the configuration associated with the active BWP(s) (e.g., associated TCI state pool(s)/table(s)) in use when the UE receives the DCI indicating the TCI update to determine the corresponding TCI state indicated by the TCI update. In some instances, the UE (and the network unit) may utilize the configuration associated with the active BWP(s) (e.g., associated TCI state pool(s)/table(s)) indicated in the most recent BWP update to determine the corresponding TCI state indicated by the TCI update. In this regard, the configuration associated with the active BWP(s) indicated in the most recent BWP update may be used for determining the associated TCI state, regardless of whether the UE has actually switched to the new active BWP(s) at the time. In some instances, the UE (and the network unit) may utilize the configuration associated with the active BWP(s) (e.g., SCS of the active BWP(s)) in use when the UE receives the DCI indicating the TCI update to determine the BAT for implementing the TCI update. In some instances, the UE (and the network unit) may utilize the configuration associated with the active BWP(s) (e.g., SCS of the active BWP(s)) indicated in the most recent BWP update to determine the corresponding TCI state indicated by the TCI update. In this regard, the configuration associated with the active BWP(s) indicated in the most recent BWP update may be used for determining the associated TCI state, regardless of whether the UE has actually switched to the new active BWP(s) at the time.

In some instances, the UE may update the active BWP after receiving a DCI indicating a TCI update, but before updating the TCI state. In some aspects, the updated TCI state may be the TCI state corresponding to the configuration of the BWP (e.g., active BWP) when UE receives the DCI or the TCI state corresponding to the configuration of the BWP (e.g., active BWP) indicated in the most recent BWP update, even if the most recently indicated active BWP is not currently active. In some instances, the UE may determine the BAT based on the active BWP(s)

In some aspects, when a BWP update and a TCI update are indicated in the same command (e.g. same DCI), the BWP switching time may be no shorter than the BAT, such that TCI update may take effect no later than BWP update. That is, the TCI update may take effect at the same time or before the BWP update. In some aspects, the BAT may be no shorter than the BWP switching time, such that BWP update may take effect no later than the TCI update. That is, the BWP update may take effect at the same time or before the TCI update. In some aspects, the BWP switching time and the BAT are equal. In some aspects, the BWP switching time and the BAT have corresponding times such that the BWP update and the TCI update take effect at the same time or approximately the same time.

In some aspects, referring back to FIGS. 8A and 8B, the first DCI (e.g., DCI 2) indicates a first TCI update without scheduling a data transmission (e.g., PDSCH communication), and at most 1 transport block (TB) can be scheduled in a slot for a component carrier (CC). The second DCI (e.g., DCI 1) indicates a second TCI update and schedules a PDSCH communication. The UE may transmit 1 ACK/NACK bit for the ACK/NACK of one slot as the HARQ feedback for the second DCI. In some aspects, the UE may transmit the 1 ACK/NACK bit indicating the first ACK using ACK/NACK resources associated with the slot in which the first DCI is received. In some aspects, the derived location of the vPDSCH (e.g., virtual PDSCH 2, indicated in the first DCI) may be in a different slot than another PDSCH communication (the PDSCH 1 scheduled by DCI 1), referring back to FIG. 8A. The UE may receive a derived location (e.g., in the first DCI) of the vPDSCH to be one slot (e.g., slot 3), and receive the PDSCH communication (e.g., PDSCH 1) in a different slot (e.g., slot 2). In other words, the derived location of the vPDSCH is different from the location of the PDSCH communication. If the derived location of the vPDSCH is the same location as the PDSCH, the UE may determine an error has occurred in the DL assignment, referring back to FIG. 8B. In some other aspects, the UE may transmit the first ACK using resources associated with the ACK/NACK of the PDSCH communication. The UE may thus determine the order to transmit the first ACK and the second ACK, e.g., in the PUCCH, based on the locations of the PDSCH and the vPDSCH. UE may determine the order to transmit the first ACK and the second ACK (e.g., based on the offset indicators as described above), transmit the first ACK and the second ACK, and switch to new TCI states based on the time the later one of the first ACK and the second ACK is transmitted.

In some aspects, the offset (e.g., k0) between the derived location of the vPDSCH and the location of the first DCI may be 0. Thus, the derived location of the vPDSCH and the location of the first DCI may be adjacent slots. In other words, when k0 is equal to zero, the UE may not receive the first DCI in the same slot as the PDSCH communication. The UE may receive the first DCI in a different slot than the PDSCH communication. The UE may determine the order to transmit the first ACK and the second ACK accordingly and transmit the first ACK in a slot different from the derived location of the vPDSCH. In some aspects, the UE may use ACK/NACK resources associated with the slot in which the first DCI is received and not associated with the PDSCH communication.

In some aspects, referring back to FIG. 8C, the first DCI (e.g., DCI 2) indicates a first TCI update without scheduling a data transmission (e.g., PDSCH communication), and at most 2 transport blocks (TBs) can be scheduled in a slot for a component carrier (CC). The second DCI (e.g., DCI 1) indicates a second TCI update and schedules a PDSCH communication (e.g., PDSCH 1). The UE may transmit two ACK/NACK bits for the ACK/NACK of one slot. In some aspects, the UE may transmit a communication that includes a first ACK/NACK bit indicating the ACK/NACK of PDSCH communication and a second ACK/NACK bit indicating the first ACK. In some aspects, the location of the ACK/NACK bit for the first ACK is predetermined, e.g., in a RRC communication. For example, the derived location of the vPDSCH (virtual PDSCH 2) may be slot 1, and the PDSCH communication (e.g., PDSCH 1) is also received, by the UE, in the slot 1. The UE may transmit 2 ACK/NACK bits for the ACK/NACK of the slot (e.g., slot 1). The 2 ACK/NACK bits may include one ACK/NACK bit for the ACK/NACK of the PDSCH communication, and another ACK/NACK bit for the first ACK. The UE may thus determine the order to transmit the first ACK and the second ACK, e.g., in the PUCCH, based on the bit location for the PDSCH communication and the bit location for the first ACK. The UE may then transmit the first ACK and the second ACK in the order, and switch to new TCI states based on the time the later one of the first ACK and the second ACK is transmitted.

In some aspects, referring back to FIGS. 10A and 10B, the UE may receive the second DCI (e.g., DCI 1) prior to the first DCI (e.g., DCI 2), and may transmit the first ACK no earlier than the second ACK. In some aspects, the UE may employ the rule illustrated in FIGS. 10A and 10B to determine the order that the first ACK and the second ACK is transmitted to the BS. For example, the UE may receive the second DCI prior to the first DCI and may transmit the first ACK later than the second ACK of the second DCI. In some aspects, the first DCI (e.g., DCI 2) indicates a first TCI update and a vPDSCH, without scheduling a PDSCH. The UE may receive the vPDSCH earlier than, at the same time as, or later than the PDSCH. The UE may transmit the first ACK (based on the derived location of the vPDSCH) and the second ACK based on the determined order, and switch to new TCI states indicated by the first DCI based on the time the later one of the first ACK and the second ACK is transmitted.

In some aspects, referring back to FIG. 11, the UE may receive the first DCI (e.g., DCI 2) and the second DCI (e.g., DCI 1) in the same slot. The UE may transmit the first ACK and a second ACK associated with the second DCI in the type-1 HARQ ACK/NACK codebook feedback in an order based on one or more of the start time(s) of the PDSCH communication(s), and a priority of the PDSCH communications. In some aspects, downlink assignment indices (DAI) counter is employed to count the number of PDSCH communications that the UE should ACK/NACK in the same feedback. The description of the type-2 HARQ ACK/NACK codebook feedback may be referred back to the description of FIG. 7B. The order of the DCIS (e.g., the first DCI and the second DCI) in the DAI counter is based on the time order (e.g., times of the DCIS received by the UE) of the DCIS. For example, the first DCI and the second DCI may respectively schedule a PDSCH communication. The UE may determine an order of the first ACK and the second ACK based on the start time(s) of the PDSCH communications scheduled by the first DCI and the second DCI. The start times may be in different slots. In some aspects, the first DCI (e.g., DCI 2) indicates a first TCI update and a vPDSCH without scheduling a data transmission (e.g., PDSCH communication), and at most 2 transport blocks (TBs) can be scheduled in a slot for a component carrier (CC). The second DCI (e.g., DCI 1) may schedule a PDSCH communication (e.g., PDSCH 1). The UE may determine an order of the first ACK and the second ACK based on prioritizing the vPDSCH (associated with the first DCI, e.g., virtual PDSCH 2) over semi-persistent scheduling (SPS) PDSCH over PDSCH (e.g., PDSCH 1). The UE may transmit the first ACK and the second ACK based on the determined order, and switch to new TCI states based on the time the later one of the first ACK and the second ACK is transmitted. For example, if the vPDSCH is prioritized, the UE may transmit the first ACK later than the second ACK, and switch to the TCI state indicated by the first ACK from the current TCI state.

In some aspects, referring back to FIG. 12, the UE may receive the first DCI and the second DCI at different times (e.g., slots), and the location of the first ACK and the location of the second ACK may be determined to be in the same slot (e.g., based on the offset indicators in the first DCI and the second DCI). The UE may then prioritize the first ACK and the second ACK in an order such that the first ACK and the second ACK may be sent in different slots. In some aspects, the UE may determine the order in which the first ACK and the second ACK are transmitted. The order may be based on one or more of the reception times of the first DCI and the second DCI, TCI values indicated by the first TCI update and the second TCI update, or HARQ codebook positions of the first ACK and the second ACK. The UE may then prioritize the first TCI update and the second TCI update based on the times to transmit the first ACK and the second ACK. In some aspects, the first DCI (e.g., DCI 2) indicates a first TCI update without scheduling a data transmission (e.g., PDSCH communication).

In some aspects, referring back to FIG. 13, the UE may receive a plurality of PDSCH communications (e.g., 604a, 604b, . . . ) associated with a same DCI (e.g., the first DCI and/or the second DCI). The plurality of PDSCH communications (e.g., multi-PDSCHs) may be in different slots, e.g., each in a different slot. The UE may transmit a ACK associated with the DCI in a position corresponding to at least one of the plurality of PDSCH communications. For example, the first DCI (e.g., DCI) may be associated with a plurality of PDSCH communications (e.g., multi-PDSCHs), each of the plurality of PDSCHs may have a respective start and length indicator value (SLIV). The UE may transmit the first ACK associated with the first DCI in type-2 HARQ-ACK codebook feedback based on a SLIV of the at least one of the plurality SLIVs. That is, the location of the first ACK can be determined using the location of the at least one PDSCH communication.

In some aspects, as shown in FIG. 13, one or both of the first DCI and the second DCI may have a format for a plurality of data transmissions (e.g., multiple PDSCH communications) and no data transmission (e.g., PDSCH communication) is scheduled. For example, the first DCI indicates a first TCI update without scheduling a PDSCH communication, and the format of the first DCI is for scheduling a plurality of PDSCH communications. The first DCI may indicate the derived location of a vPDSCH. In some aspects, the UE may transmit the first ACK in type-1 HARQ-ACK codebook. The derived location of the vPDSCH may not be in the same slot as any scheduled PDSCH communications (if any). The UE may determine the derived location of the vPDSCH to be any or all of the values of (k1-k0) is among the set of slot timing for k1 defined in a RRC list. In an example, the UE may use the value of k0 from the last one of the row k0 in the TDRA field of the first DCI. The UE may then transmit the first ACK and the second ACK in an order based on the scenario defined above, and switch to new TCI states based on the time the later one of the first ACK and the second ACK is transmitted.

In some aspects, referring back to FIG. 9, the UE may receive a DCI (e.g., at least one of the first DCI and the second DCI) that indicates a TCI update and schedules a data transmission (e.g., PDSCH communication). The PDSCH communication may include one or more codeblock groups (CBGs). Each of the CBG may include one or more codeblocks. The UE may transmit an ACK associated with the DCI as part of a CBG HARQ feedback. For example, the first and/or the second DCI (e.g., DCI) may indicate a TCI update (e.g., TCI) and schedule a PDSCH communication, which includes one or more CBGs (e.g., 604a, 604b, . . . ). The UE may transmit the first ACK and/or second ACK as part of the CBG HARQ feedback in the PUCCH. In some aspects, the CBG HARQ feedback may include a plurality of ACK/NACK bits for the ACK/NACK of the plurality of CBGs, and the UE may transmit the first ACK as at least one ACK/NACK bit in the plurality of ACK/NACK bits. The UE may switch to new TCI states based on the time the later one of the first ACK and the second ACK is transmitted.

In some aspects, referring back to FIG. 9, the UE may receive a DCI (e.g., at least one of the first DCI and the second DCI) that indicates a TCI update and schedules a data transmission (e.g., PDSCH communication). The PDSCH communication may include a plurality of data streams. The number of data streams, transmitted in parallel, may be equal to or greater than 2, and may be transmitted in at least one code word (CW). The UE may transmit an ACK associated with the DCI as part of a HARQ feedback. For example, the first DCI and/or the second DCI (e.g., DCI) may indicate a TCI update (e.g., TCI) and schedule a PDSCH communication, which includes one or more data streams (e.g., 604a, 604b, . . . ). The UE may transmit the first ACK and/or second ACK as part of the HARQ feedback in the PUCCH. In some aspects, the HARQ feedback may include one or more ACK/NACK bits for the ACK/NACK of the at least one CW, and the UE may transmit the first ACK and/or second ACK as at least one ACK/NACK bit in the one or more ACK/NACK bits. The UE may switch to new TCI states based on the time the later one of the first ACK and the second ACK is transmitted.

Figure 17:
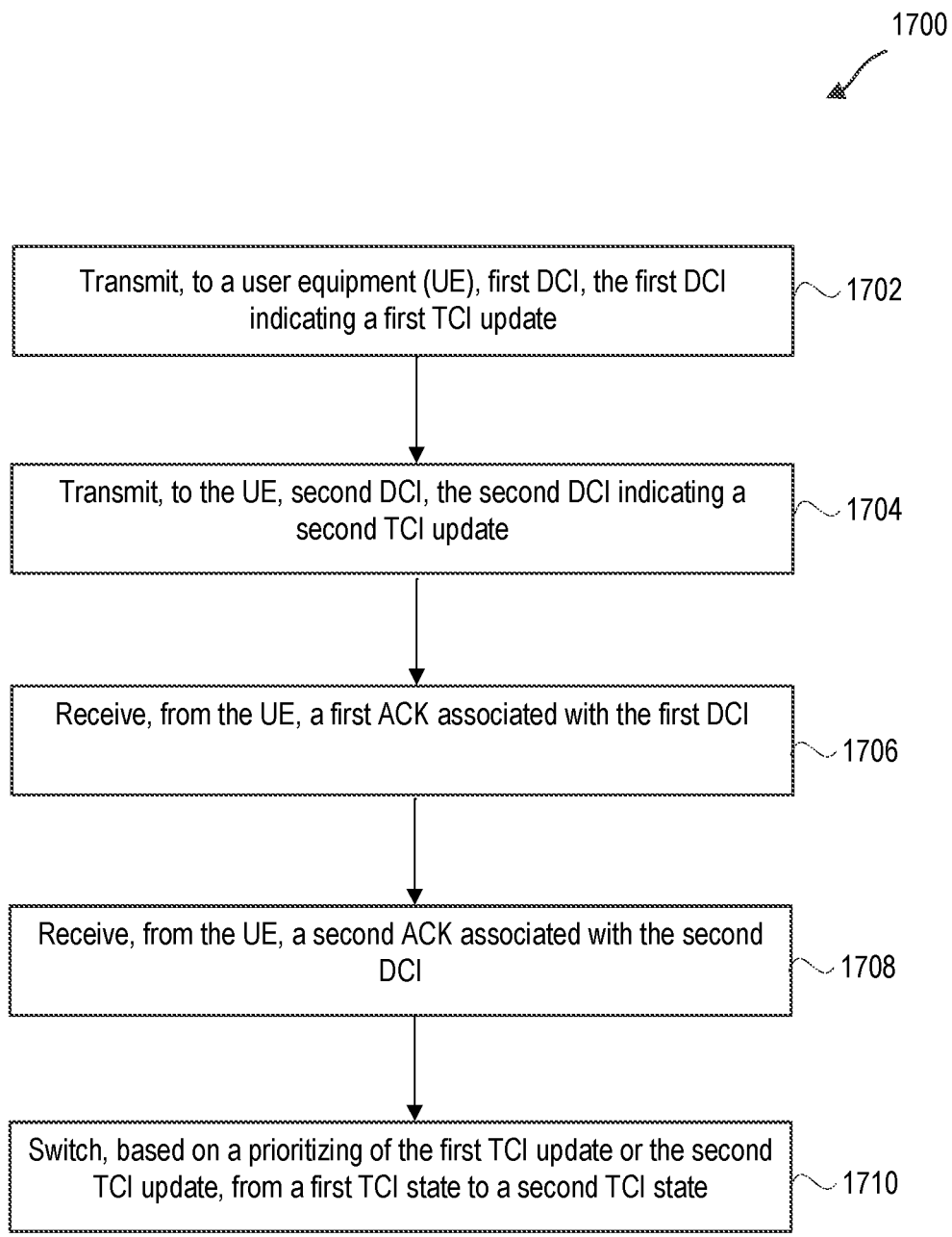
FIG. 17 is a flow diagram illustrating a beam indication communication method according to one or more aspects of the present disclosure.

FIG. 17 is a flow diagram illustrating a wireless communication method 1700 according to one or more aspects of the present disclosure. Aspects of the method 1700 can be executed by a computing device (e.g., a processor, processing circuit, and/or other suitable component) of a wireless communication device or other suitable means for performing the blocks. For instance, the wireless communication device may be a network entity 1400, BS 105, DU 240, and/or CU 230. The network entity 1400 may utilize one or more components, such as the processor 1402, the memory 1404, the beam module 1408, the transceiver 1410, the modem 1412, the RF unit 1414, and/or the one or more antennas 1416, to execute the blocks of method 1700. The method 1700 may employ similar mechanisms as described in FIGS. 6A-6C, 7A, 7B, 8A-8C, 9, 10A, 10B, and 11-13. As illustrated, the method 1700 includes a number of enumerated blocks, but aspects of the method 1700 may include additional blocks before, after, and in between the enumerated blocks. In some aspects, one or more of the enumerated blocks may be omitted or performed in a different order.

At block 1702, the network unit (e.g., BS 105, DU 240, CU 230 and/or network unit 1400) transmits first DCI. The network unit may transmit the first DCI to a UE (e.g., US 115 and/or UE 1500). The BS may transmit the first DCI via a PDCCH or other suitable communications channel. The first DCI may be in any suitable DCI message format, including without limitation DCI 1_1 and DCI 1_2. The first DCI may indicate a first transmission configuration indication (TCI) update. In some aspects, the first DCI may schedule one or more data transmissions in addition to indicating the first TCI update. In some aspects, the first DCI may not schedule any data transmissions along with indicating the first TCI update. In some aspects, when the first DCI does not schedule a data communication, the UE may utilize the Type-1 HARQ-ACK codebook and/or the Type-2 HARQ-ACK codebook in a similar manner as to when the first DCI schedules one or more data communications. In some aspects, the first DCI may include an indication of a location of the vPDSCH. The network entity 1400 may utilize one or more components, such as the processor 1402, the memory 1404, the beam module 1408, the transceiver 1410, the modem 1412, the RF unit 1414, and/or the one or more antennas 1416, to execute the actions of block 1702. The detailed description of the first DCI, the first TCI update, the PDSCH communications, and the vPDSCH may be referred to that of block 1602 and is not repeated herein.

At block 1704, the network unit (e.g., BS 105, RU 240, DU 230, CU 210, and/or network unit 1400) transmits the second DCI. The network unit may transmit the second DCI to a UE (e.g., UE 115 or UE 1500). In some aspects, the second DCI and the first DCI are transmitted by the same network unit. The UE may receive the second DCI before, simultaneously with, or after the first DCI. The network unit may transmit the second DCI via a PDCCH or other suitable communications channel. The second DCI may be in any suitable DCI message format, including without limitation DCI 1_1 and DCI 1_2. The second DCI may indicate a second TCI update different from the first TCI update. In some aspects, the second TCI update may include transmission to activate another new TCI state that is different from the new TCI state of block 1602. In some aspects, the second DCI may schedule one or more data transmissions in addition to indicating the second TCI update. In some aspects, the second DCI may not schedule any data transmissions along with indicating the second TCI update. In some aspects, when the second DCI does not schedule a data communication, the network unit may utilize the Type-1 HARQ-ACK codebook and/or the Type-2 HARQ-ACK codebook in a similar manner as to when the second DCI schedules one or more data communications. In this manner, a vPDSCH may be utilized to determine the resources utilized for the ACK/NACK associated with the second DCI. The network entity 1400 may utilize one or more components, such as the processor 1402, the memory 1404, the beam module 1408, the transceiver 1410, the modem 1412, the RF unit 1414, and/or the one or more antennas 1416, to execute the actions of block 1704. The detailed description of the second DCI, the second TCI update, the PDSCH communications, and the vPDSCH may be referred to that of block 1704 and is not repeated herein.

At block 1706, the network unit (e.g., BS 105, RU 240, DU 230, CU 210, and/or network unit 1400) receives, from the UE (e.g., UE 115 or UE 1500), a first acknowledgement (ACK) associated with the first DCI. In some aspects, the network unit may receive the first ACK via a PUSCH and/or PUCCH. The network entity 1400 may utilize one or more components, such as the processor 1402, the memory 1404, the beam module 1408, the transceiver 1410, the modem 1412, the RF unit 1414, and/or the one or more antennas 1416, to execute the actions of block 1706. The detailed description of the first ACK may be referred to that of block 1606 and is not repeated herein.

At block 1708, the network unit (e.g., BS 105, RU 240, DU 230, CU 210, and/or network unit 1400) receives, from the UE (e.g., UE 115 or UE 1500), a second acknowledgement (ACK) associated with the second DCI. In some aspects, the network unit may receive the second ACK via a PUSCH and/or PUCCH. The network entity 1400 may utilize one or more components, such as the processor 1402, the memory 1404, the beam module 1408, the transceiver 1410, the modem 1412, the RF unit 1414, and/or the one or more antennas 1416, to execute the actions of block 1708. The detailed description of the second ACK may be referred to that of block 1608 and is not repeated herein.

At block 1710, the network unit (e.g., BS 105, RU 240, DU 230, CU 210, and/or network unit 1400) switches, based on a prioritizing of the first TCI update or the second TCI update, from a first TCI state to a second TCI state. The UE may prioritize the first TCI update or the second TCI update based on the scenarios/rules discussed above in the context of FIGS. 6A-6C, 7A, 7B, 8A-8C, 9, 10A, 10B, and 11-13. The network entity 1400 may utilize one or more components, such as the processor 1402, the memory 1404, the beam module 1408, the transceiver 1410, the modem 1412, the RF unit 1414, and/or the one or more antennas 1416, to execute the actions of block 1710. The detailed description of the second ACK may be referred to that of block 1610 and is not repeated herein.

In various aspects of the present disclosure, the prioritizing of the first TCI update and the second TCI update are described in FIGS. 8A-8C, 9, 10A, 10B, and 11-13, as well as FIG. 15. The detailed description of the prioritizing the first TCI update and the second TCI update is not repeated herein.

Other aspects of the present disclosure include:

Clause 1: A method of wireless communication performed by a user equipment (UE), the method comprising: receiving first downlink control information (DCI), the first DCI indicating a first transmission configuration indication (TCI)

update; receiving second DCI, the second DCI indicating a second TCI update different than the first TCI update; transmitting, based on the first DCI, a first acknowledgement (ACK) associated with the first DCI; transmitting, based on the second DCI, a second ACK associated with the second DCI; and switching, based on a prioritizing of the first TCI update or the second TCI update, from a first TCI state to a second TCI state.

Clause 2: The method of clause 1, wherein the prioritizing of the first TCI update or the second TCI update is based on at least one of: reception times of the first DCI and the second DCI; TCI values of the first TCI update and the second TCI update; codebook positions of the first ACK and the second ACK; or transmission times of the transmitting the first ACK and the transmitting the second ACK.

Clause 3: The method of clause 1 or 2, wherein the first DCI does not schedule a physical downlink shared channel (PDSCH) communication.

Clause 4: The method of any one of clauses 1-3, wherein: the receiving the first DCI comprises receiving the first DCI in a first slot; and the transmitting the first ACK associated with the first DCI comprises transmitting the first ACK associated with the first DCI in a second slot different from the first slot, the second slot being offset from the first slot based on an offset indicator of the first DCI.

Clause 5: The method of any one of clauses 1-4, wherein: the transmitting the first ACK in the second slot comprises transmitting the first ACK using acknowledgement/negative acknowledgement (ACK/NACK) resources associated with the first slot.

Clause 6: The method of any one of clauses 1-5, wherein:
the second DCI schedules a first physical downlink shared channel (PDSCH) communication; and the transmitting the first ACK associated with the first DCI comprises transmitting the first ACK associated with the first DCI using resources not associated with an acknowledgement/negative acknowledgement (ACK/NACK) of the first PDSCH communication.

Clause 7: The method of any one of clauses 1-6, wherein: the second DCI schedules a first PDSCH communication; and the transmitting the first ACK associated with the first DCI comprises transmitting the first ACK associated with the first DCI using resources associated with an acknowledgement/negative acknowledgement (ACK/NACK) of the first PDSCH communication.

Clause 8: The method of any one of clauses 1-3, wherein the transmitting the first ACK associated with the first DCI comprises: transmitting a communication including a first bit indicating the ACK/NACK of the first PDSCH communication and a second bit indicating the first ACK associated with the first DCI.

Clause 9: The method of any one of clauses 1-8, wherein: the receiving the second DCI occurs prior to the receiving the first DCI; and the transmitting the first ACK associated with the first DCI comprises transmitting the first ACK associated with the first DCI no earlier than transmitting an acknowledgement/negative acknowledgement (ACK/NACK) associated with the second DCI.

Clause 10: The method of any one of clauses 1-9, wherein the switching from the first TCI state to the second TCI state comprises: switching, after transmitting the first ACK, from the first TCI state to the second TCI state based on the first TCI update.

Clause 11: The method of any one of clauses 1-8, wherein: the receiving second DCI occurs in a same slot as the receiving the first DCI; and wherein the transmitting the first ACK associated with the first DCI comprises transmitting the first ACK associated with the first DCI as part of type-2 hybrid automatic repeat request (HARQ) acknowledgement/negative acknowledgement (ACK/NACK) codebook feedback, the type-2 HARQ ACK/NACK codebook feedback including the first ACK associated with the first DCI and the second ACK associated with the second DCI.

Clause 12: The method of clause 11, further comprising: determining an order within the type-2 HARQ ACK/NACK codebook feedback of the first ACK associated with the first DCI and the second ACK associated with the second DCI based on at least one of: a start time; or a priority.

Clause 13: The method of any one of clauses 1-3, wherein: the first DCI includes a DCI format associated with scheduling a plurality of PDSCH communications; and the transmitting the first ACK associated with the first DCI comprises transmitting the first ACK associated with the first DCI in a position corresponding to at least one of the plurality of PDSCH communications.

Clause 14: The method of clause 13, wherein the transmitting the first ACK associated with the first DCI is further based on a start and length indicator value (SLIV); and
further comprising selecting the SLIV from a plurality of SLIVs.

Clause 15: The method of any one of clauses 1-14, wherein the transmitting the first ACK associated with the first DCI comprises transmitting the first ACK associated with the first DCI as at least one bit of a plurality of bits of a codeblock group hybrid automatic repeat request (HARQ) feedback.

Clause 16: The method of any one of clauses 1-14, wherein the transmitting the first ACK associated with the first DCI comprises transmitting the first ACK associated with the first DCI for at least one data stream of a plurality of data streams.

Clause 17: The method of any one of clause 1-16, wherein the switching from the first TCI state to the second TCI state comprises: switching from the first TCI state to the second TCI state for a plurality of component carriers.

Clauses 18: The method of clause 17, wherein a timing for the switching from the first TCI state to the second TCI state for the plurality of component carriers is based on a smallest subcarrier spacing of the plurality of component carriers.

Clause 19: The method of any one of clauses 1-18, wherein the switching from the first TCI state to the second TCI state comprises: switching from the first TCI state to the second TCI state for all configured bandwidth parts in one or more component carriers.

Clause 20: The method of any one of clauses 1-19, wherein a timing for the switching from the first TCI state to the second TCI state is based on a beam application time associated with at least one active bandwidth part.

Clause 21: The method of any one of clauses 1-20, wherein the receiving the first DCI includes receiving the first DCI in at least one of DCI format 1_1 or a DCI format 1_2.

Clause 22: A method of wireless communication performed by a network unit, the method comprising: transmitting first downlink control information (DCI), the first DCI indicating a first transmission configuration indication (TCI) update; transmitting second DCI, the second DCI indicating a second TCI update different than the first TCI update; receiving a first acknowledgement (ACK) associated with the first DCI; receiving a second ACK associated with the second DCI; and switching, based on a prioritizing of the first TCI update or the second TCI update, from a first TCI state to a second TCI state.

Clause 23: The method of clause 22, wherein the prioritizing of the first TCI update or the second TCI update is based on at least one of: transmission times of the first DCI and the second DCI; TCI values of the first TCI update and the second TCI update; codebook positions of the first ACK and the second ACK; or reception times of the first ACK and the second ACK.

Clause 24: The method of clause 22/23, wherein the first DCI does not schedule a physical downlink shared channel (PDSCH) communication.

Clause 25: The method of any one of clauses 22-24, wherein: the transmitting the first DCI comprises transmitting the first DCI in a first slot; and the receiving the first ACK associated with the first DCI comprises receiving the first ACK associated with the first DCI in a second slot different from the first slot, the second slot being offset from the first slot based on an offset indicator of the first DCI.

Clause 26: The method of any one of clauses 22-25, wherein: the receiving the first ACK in the second slot comprises receiving the first ACK using acknowledgement/negative acknowledgement (ACK/NACK) resources associated with the first slot.

Clause 27. The method of any one of clauses 22-26, wherein: the second DCI schedules a first PDSCH communication; and the receiving the first ACK associated with the first DCI comprises receiving the first ACK associated with the first DCI using resources not associated with an acknowledgement/negative acknowledgement (ACK/NACK) of the first PDSCH communication.

Clause 28: The method of any one of clauses 22-27, wherein: the second DCI schedules a first PDSCH communication; and the receiving the first ACK associated with the first DCI comprises receiving the first ACK associated with the first DCI using resources associated with an acknowledgement/negative acknowledgement (ACK/NACK) of the first PDSCH communication.

Clause 29: The method of clause 28, wherein the receiving the first ACK associated with the first DCI comprises: receiving a communication including a first bit indicating the ACK/NACK of the first PDSCH communication and a second bit indicating the first ACK associated with the first DCI.

Clause 30: The method of any one of clauses 22-29, wherein: the transmitting the second DCI occurs prior to the transmitting the first DCI; and the receiving the first ACK associated with the first DCI comprises receiving the first ACK associated with the first DCI no earlier than receiving the second ACK associated with the second DCI.

Clause 31: The method of clause 30, wherein the switching from the first TCI state to the second TCI state comprises: switching, after receiving the first ACK, from the first TCI state to the second TCI state based on the first TCI update.

Clause 32: The method of any one of clauses 22-31, wherein: the transmitting second DCI occurs in a same slot as the transmitting the first DCI; and wherein the receiving the first ACK associated with the first DCI comprises receiving the first ACK associated with the first DCI as part of type-2 hybrid automatic repeat request (HARQ) acknowledgement/negative acknowledgement (ACK/NACK) codebook feedback, the type-2 HARQ ACK/NACK codebook feedback including the first ACK associated with the first DCI and the second ACK associated with the second DCI.

Clause 33: The method of clause 32, further comprising: determining an order within the type-2 HARQ ACK/NACK codebook feedback of the first ACK associated with the first DCI and the second ACK associated with the second DCI based on at least one of: a start time; or a priority.

Clause 34: The method of any one of clauses 22-24, wherein: the first DCI includes a DCI format associated with scheduling a plurality of PDSCH communications; and the receiving the first ACK associated with the first DCI comprises receiving the first ACK associated with the first DCI in a position corresponding to at least one of the plurality of PDSCH communications.

Clause 35: The method of clause 34, wherein the receiving the first ACK associated with the first DCI is further based on a start and length indicator value (SLIV); and further comprising: selecting the SLIV from a plurality of SLIVs.

Clause 36: The method of any one of clauses 22-35, wherein the receiving the first ACK associated with the first DCI comprises receiving the first ACK associated with the first DCI as at least one bit of a plurality of bits of a codeblock group hybrid automatic repeat request (HARQ) feedback.

Clause 37: The method of any one of clauses 22-35, wherein the receiving the first ACK associated with the first DCI comprises receiving the first ACK associated with the first DCI for at least one data stream of a plurality of data streams.

Clause 38: The method of any one of clauses 22-37, wherein the switching from the first TCI state to the second TCI state comprises: switching from the first TCI state to the second TCI state for a plurality of component carriers.

Clause 39: The method of any one of clauses 22-38, wherein a timing for the switching from the first TCI state to the second TCI state for the plurality of component carriers is based on a smallest subcarrier spacing of the plurality of component carriers.

Clause 40: The method of any one of clauses 22-39, wherein the switching from the first TCI state to the second TCI state comprises: switching from the first TCI state to the second TCI state for all configured bandwidth parts in one or more component carriers.

Clause 41: The method of any one of clauses 22-40, wherein a timing for the switching from the first TCI state to the second TCI state is based on a beam application time associated with at least one active bandwidth part.

Clause 42: The method of clauses 22-41, wherein the transmitting the first DCI includes transmitting the first DCI in at least one of DCI format 1_1 or a DCI format 1_2.

Aspect 43 includes a non-transitory computer-readable medium storing one or more instructions for wireless communication, the one or more instructions comprising one or more instructions that, when executed by one or more processors of a UE, cause the UE to perform any one of aspects 1-21.

Aspect 44 includes a non-transitory computer-readable medium storing one or more instructions for wireless communication, the one or more instructions comprising one or more instructions that, when executed by one or more processors of a network unit cause the network unit to perform any one of aspects 22-42.

Aspect 45 includes a user equipment (UE) comprising one or more means to perform any one or more of aspects 1-21.

Aspect 46 includes a network unit comprising one or more means to perform any one or more of aspects 22-42.

Aspect 47 includes a user equipment (UE) comprising: a memory; a transceiver; and at least one processor coupled to the memory and the transceiver, wherein the UE is configured to one or more of aspects 1-21.

Aspect 48 includes a network unit comprising: a memory; a transceiver; and at least one processor coupled to the memory and the transceiver, wherein the network unit is configured to one or more of aspects 22-42.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For instance, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for instance, a list of items prefaced by a phrase such as "at least one of" or "one or more of") indicates an inclusive list such that, for instance, a list of [at least one of A, B, or C] means A or B or C or AB or AC or BC or ABC (e.g., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some aspects thereof, but rather, should be fully commensurate with that of the claims appended hereafter and their functional equivalents.

What is claimed is:

1. A method of wireless communication performed by a user equipment (UE), the method comprising:
receiving first downlink control information (DCI), the first DCI indicating a first transmission configuration indication (TCI) update;
receiving second DCI, the second DCI indicating a second TCI update different than the first TCI update;
transmitting, based on the first DCI, a first acknowledgement (ACK) associated with the first DCI;
transmitting, based on the second DCI, a second ACK associated with the second DCI; and
switching, based on a relative priority of the first TCI update and the second TCI update, from a first TCI state to a second TCI state.

2. The method of claim 1, wherein the relative priority of the first TCI update and the second TCI update is based on at least one of:
reception times of the first DCI and the second DCI;
TCI values of the first TCI update and the second TCI update;
codebook positions of the first ACK and the second ACK; or
transmission times of the transmitting the first ACK and the transmitting the second ACK.

3. The method of claim 1, wherein the first DCI does not schedule a physical downlink shared channel (PDSCH) communication.

4. The method of claim 1, wherein:
the receiving the first DCI comprises receiving the first DCI in a first slot; and
the transmitting the first ACK associated with the first DCI comprises transmitting the first ACK associated with the first DCI in a second slot different from the first slot, the second slot being offset from the first slot based on an offset indicator of the first DCI.

5. The method of claim 4, wherein:
the transmitting the first ACK in the second slot comprises transmitting the first ACK using acknowledgement/negative acknowledgement (ACK/NACK) resources associated with the first slot.

6. The method of claim 1, wherein:
the second DCI schedules a first physical downlink shared channel (PDSCH) communication; and
the transmitting the first ACK associated with the first DCI comprises transmitting the first ACK associated with the first DCI using resources not associated with an acknowledgement/negative acknowledgement (ACK/NACK) of the first PDSCH communication.

7. The method of claim 1, wherein:
the second DCI schedules a first PDSCH communication; and
the transmitting the first ACK associated with the first DCI comprises transmitting the first ACK associated with the first DCI using resources associated with an acknowledgement/negative acknowledgement (ACK/NACK) of the first PDSCH communication.

8. The method of claim 7, wherein the transmitting the first ACK associated with the first DCI comprises:
transmitting a communication including a first bit indicating the ACK/NACK of the first PDSCH communication and a second bit indicating the first ACK associated with the first DCI.

9. The method of claim 1, wherein:
the receiving the second DCI occurs prior to the receiving the first DCI; and
the transmitting the first ACK associated with the first DCI comprises transmitting the first ACK associated with the first DCI no earlier than transmitting an acknowledgement/negative acknowledgement (ACK/NACK) associated with the second DCI.

10. The method of claim 9, wherein the switching from the first TCI state to the second TCI state comprises:
switching, after transmitting the first ACK, from the first TCI state to the second TCI state based on the first TCI update.

11. The method of claim 1, wherein:
the receiving second DCI occurs in a same slot as the receiving the first DCI; and
wherein the transmitting the first ACK associated with the first DCI comprises transmitting the first ACK associated with the first DCI as part of hybrid automatic repeat request (HARQ) acknowledgement/negative acknowledgement (ACK/NACK) codebook type 2 feedback, the HARQ ACK/NACK codebook type 2 feedback including the first ACK associated with the first DCI and the second ACK associated with the second DCI.

12. The method of claim 11, further comprising:
determining an order within the HARQ ACK/NACK codebook type 2 feedback of the first ACK associated with the first DCI and the second ACK associated with the second DCI based on at least one of:
a start time; or
a priority.

13. The method of claim 1, wherein:
the first DCI includes a DCI format associated with scheduling a plurality of PDSCH communications; and
the transmitting the first ACK associated with the first DCI comprises transmitting the first ACK associated with the first DCI in a position corresponding to at least one of the plurality of PDSCH communications.

14. The method of claim 13, wherein the transmitting the first ACK associated with the first DCI is further based on a start and length indicator value (SLIV); and
further comprising:
selecting the SLIV from a plurality of SLIVs.

15. The method of claim 1, wherein the transmitting the first ACK associated with the first DCI comprises transmitting the first ACK associated with the first DCI as at least one bit of a plurality of bits of a codeblock group hybrid automatic repeat request (HARQ) feedback.

16. The method of claim 1, wherein the transmitting the first ACK associated with the first DCI comprises transmitting the first ACK associated with the first DCI for at least one data stream of a plurality of data streams.

17. The method of claim 1, wherein the switching from the first TCI state to the second TCI state comprises:
switching from the first TCI state to the second TCI state for a plurality of component carriers.

18. The method of claim 17, wherein a timing for the switching from the first TCI state to the second TCI state for the plurality of component carriers is based on a smallest subcarrier spacing of the plurality of component carriers.

19. The method of claim 1, wherein the switching from the first TCI state to the second TCI state comprises:
switching from the first TCI state to the second TCI state for all configured bandwidth parts in one or more component carriers.

20. The method of claim 1, wherein a timing for the switching from the first TCI state to the second TCI state is based on a beam application time associated with at least one active bandwidth part.

21. The method of claim 1, wherein the receiving the first DCI includes receiving the first DCI in at least one of DCI format 1_1 or a DCI format 1_2.

22. A user equipment (UE), comprising:
a memory;
a transceiver; and
at least one processor coupled to the memory and the transceiver, wherein the UE is configured to:
receive first downlink control information (DCI), the first DCI indicating a first transmission configuration indication (TCI) update;
receive second DCI, the second DCI indicating a second TCI update different than the first TCI update;
transmit, based on the first DCI, a first acknowledgement (ACK) associated with the first DCI;
transmit, based on the second DCI, a second ACK associated with the second DCI; and
switch, based on a relative priority of the first TCI update and the second TCI update, from a first TCI state to a second TCI state.

23. The UE of claim 22, wherein the UE is further configured to relatively prioritize the first TCI update and the second TCI update based on at least one of:
reception times of the first DCI and the second DCI;
TCI values of the first TCI update and the second TCI update;
codebook positions of the first ACK and the second ACK; or
transmission times of the transmitting the first ACK and the transmitting the second ACK.

24. The UE of claim 22, wherein:
the second DCI schedules a first PDSCH communication; and
the UE is further configured to
transmit the first ACK associated with the first DCI using resources associated with an acknowledgement/negative acknowledgement (ACK/NACK) of the first PDSCH communication.

25. The UE of claim 22, wherein the UE is further configured to:
receive second DCI in a same slot as the first DCI; and
transmit the first ACK associated with the first DCI as part of hybrid automatic repeat request (HARQ) acknowledgement/negative acknowledgement (ACK/NACK) codebook type 2 feedback, the HARQ ACK/NACK codebook type 2 feedback including the first ACK associated with the first DCI and the second ACK associated with the second DCI.

26. The UE of claim 25, wherein the UE is further configured to:
determine an order within the HARQ ACK/NACK codebook type 2 feedback of the first ACK associated with the first DCI and the second ACK associated with the second DCI based on at least one of:
a start time; or
a priority.

27. The UE of claim 22, wherein the UE is further configured to:
switch from the first TCI state to the second TCI state for a plurality of component carriers.

28. A non-transitory computer-readable medium having program code recorded thereon for execution by at least one processor of a user equipment (UE), the program code comprising:
code for causing the UE to receive first downlink control information (DCI), the first DCI indicating a first transmission configuration indication (TCI) update;
code for causing the UE to receive second DCI, the second DCI indicating a second TCI update different than the first TCI update;
code for causing the UE to transmit, based on the first DCI, a first acknowledgement (ACK) associated with the first DCI;
code for causing the UE to transmit, based on the second DCI, a second ACK associated with the second DCI; and
code for causing the UE to switch, based on a relative priority of the first TCI update and the second TCI update, from a first TCI state to a second TCI state.

29. The non-transitory computer-readable medium of claim 28, further comprising:

code for causing the UE to relatively prioritize the first TCI update er and the second TCI update based on at least one of:
reception times of the first DCI and the second DCI;
TCI values of the first TCI update and the second TCI update;
codebook positions of the first ACK and the second ACK; or
transmission times of the transmitting the first ACK and the transmitting the second ACK.

30. The non-transitory computer-readable medium of claim 28, further comprising:
code for causing the UE to transmit the first ACK associated with the first DCI using resources associated with an acknowledgement/negative acknowledgement (ACK/NACK) of a first PDSCH communication scheduled by the second DCI.

* * * * *